United States Patent [19]
Yamaguchi et al.

[11] Patent Number: 5,724,827
[45] Date of Patent: Mar. 10, 1998

[54] ICE REGENERATIVE AIR CONDITIONER SYSTEM

[75] Inventors: Hiroichi Yamaguchi; Toshihiro Yamamoto, both of Kanagawa-ken, Japan

[73] Assignee: Kabushiki Kaisha Toshiba, Kawasaki, Japan

[21] Appl. No.: 614,150

[22] Filed: Mar. 12, 1996

[30] Foreign Application Priority Data

Mar. 15, 1995 [JP] Japan ................. 7-056257

[51] Int. Cl.$^6$ ........................ F25D 17/02
[52] U.S. Cl. ................ 62/201; 62/59; 62/434
[58] Field of Search .............. 62/59, 201, 430, 62/434; 165/10 A, 238

[56] References Cited

U.S. PATENT DOCUMENTS 5,355,688  10/1994  Rafalovich et al. .............. 62/430 X
5,381,671  1/1995  Saito et al. .................... 62/430
5,467,812  11/1995  Dean et al. .................... 62/59 X

FOREIGN PATENT DOCUMENTS 4-302953  10/1992  Japan ........................ 62/430

*Primary Examiner*—Henry A. Bennett
*Assistant Examiner*—Susanne C. Tinker
*Attorney, Agent, or Firm*—Foley & Lardner

[57] ABSTRACT

There is an ice regenerative air conditioner system in which a cooled-liquid from an ice storage tank is heated by exchanging heat between the cooled-liquid and a coolant supplied from indoor heat exchangers in a heat exchanger 1b used for heating the cooled-liquid (or water) placed against the indoor heat exchangers 1B and 1C in series, next, a super-cooled liquid is generated by exchanging heat between the cooled-liquid heated and the coolant at a super-cooling apparatus 1c placed against the indoor heat exchangers 1B and 1C in parallel.

12 Claims, 21 Drawing Sheets

FIG.4

| | VALVES 1j, 1k | VALVE 1h | VALVE 1i |
|---|---|---|---|
| ICE ACCUMULATION OPERATION MODE | CLOSED | OPEN | CONTROLLED |
| COOLING OPERATION MODE (BASE LOAD OPERATION) | CONTROLLED | CLOSED | CLOSED |
| COOLING OPERATION MODE (PEAK-SHIFTED OPERATION) | CONTROLLED | OPEN | CONTROLLED |

FIG.7

| | VALVE 2g | VALVE 2h | VALVE 2i |
|---|---|---|---|
| ICE ACCUMULATION OPERATION MODE | CLOSED | OPEN | CONTROLLED |
| COOLING OPERATION MODE (BASE LOAD OPERATION) | OPEN | CLOSED | CLOSED |
| COOLING OPERATION MODE (PEAK-SHIFTED OPERATION) | OPEN | OPEN | CONTROLLED |

COOLING OPERATION (PEAK-SHIFTED 2)

ICE REGENERATIVE AIR CONDITIONER SYSTEM

BACKGROUND OF THE INVENTION

1. Field of the Invention

The present invention relates to an ice regenerative air conditioner system, and more particularly, it relates to an ice regenerative air conditioner system which is capable of forming ice of a block state or a sherbet state in a ice heat storage tank by a super-cooled liquid which is super-cooled by a heat exchanger, namely a super-cooling apparatus, which is placed in addition to indoor heat exchangers and which is capable of accumulating the ice into the ice heat storage tank.

2. Description of the Prior Art

In general, an ice regenerative air conditioner system is a system in which ice is formed by using an electric power during a midnight whose cost is cheaper than that when the ice is formed during a day and the ice is used for a cooling operation during a day.

There are a static type and a dynamic type in the ice regenerative air conditioners. Both types are well known in the prior art field. An ice regenerative air conditioner system of the static type generates hard or solid ice around heat exchanger tubes. On the other hand, an ice regenerative air conditioner system of the dynamic type forms sherbet-stated ice around heat exchanger tubes, where the sherbet-stated ice means a state that a plurality of broken ices and liquid are mixed. In recent years, because ice can be formed and added in the dynamic type ice regenerative air conditioner system during a day, for example, so many makers or manufacture companies research and develop ice regenerative air conditioner systems of various kinds of the dynamic types. On the other hand, because ice can not be formed and added during a day so long as there is any ice in the ice heat storage tank in the ice regenerative air conditioner of the static type, namely it is difficult to formed and to add ice in the static type ice regenerative air conditioner system. Specifically, one of the dynamic type ice regenerative air conditioner systems uses a method that water is cooled into super-cooled water state (having approximately a temperature range of −1.5° C. to −2.0° C., for example). Then, the super-cooled water flows into the ice heat storage tank where ice is generated by releasing the super-cooled state of the super-cooled water. This method has the advantage of generating sherbet-state ice under a cheaper cost.

FIG. 1 is a diagram showing a configuration of a conventional ice regenerative air conditioner system. This conventional ice regenerative air conditioner system shown in FIG. 1 is a system that generates ice by using and circulating a brine such as an ethyleneglycol or a propylene glycol. In FIG. 1, a coolant flow in a coolant circuit and a water flow in a water circuit in the conventional ice regenerative air conditioner system are designated by arrows. In addition, a heat exchanger of a super-cooled water generation side is separated completely from a secondary heat exchanger to obtain the cold of ice. Further, in the conventional ice regenerative air conditioner system shown in FIG. 1, a heater to protect the heat exchanger (or a super-cooling apparatus) against a stream of ice nuclear items, each having a small sized, flowing from the ice heat storage tank to the heat exchanger is incorporated. In addition, there is an technique disclosed in Japanese Laid-open patent application No. 4-263722 as a conventional ice regenerative air conditioner system, just like the system as shown in FIG. 2A. FIG. 2A is a diagram showing a configuration of a conventional ice regenerative air conditioner system. In the ice regenerative air conditioner system as shown in FIG. 2, an ice detection means 113 is incorporated in a down-stream side of an outlet of a heat storage tank 106, cooled-water lows from the heat storage tank 106 to a heat exchanger 111. The cooled-water is heated (up to approximately 0.8° C., for example) by a coolant in the heat exchanger 111 so that ice grains or ice nuclear items are melted completely and changed to water. In this case, there is an advantage that it can be prevented for the cooled-water to be cold and to become ice in a supercooling apparatus 105. The water of approximately 0.8° C. is cooled at the super-cooling apparatus 105 and then flows into the ice heat storage tank 106.

FIG. 2B is a diagram showing a pressure-enthalpy chart. As shown in FIG. 2B, the super-cooled is directly generated the super-cooling apparatus 105 by the coolant and the water is heated by using an expansion valve and a heat exchanger instead of a heater and by using a part of condensed heat of a refrigerating cycle before the water flows to the super-cooling apparatus 105 in the ice regenerative air conditioner system shown in FIG. 1.

However, the brine such as an ethyleneglycol or a propylene glycol is used, because it is easy to control a temperature of such a brine and it is also easy to generate ice in stability. Accordingly, the super-cooling apparatus is completely separated from the heat exchanger in which the cold of ice is exchanged in configuration in the conventional ice regenerative air conditioner system as shown in FIG. 1. In this case, the configuration of the ice regenerative air conditioner system becomes greater and complicated. In addition, a peak-shifted cooling operation only is performed, because the cold of ice only drives the entire load of the air conditioner system. Further, it is difficult to connect the conventional ice regenerative air conditioner system to each air conditioner unit such as a multi-purpose air conditioner system used for a building. This air conditioner unit uses a special coolant used for an air conditioner of a small-sized or a medium-sized building.

On the other hand, in the case of the ice regenerative air conditioner system as shown in FIG. 2A, because a normal coolant is used, the ice regenerative air conditioner system can be connected to the above air conditioner unit used for a building. However, because a super-cooling apparatus, a heat generator for heating a water flowing into the super-cooling apparatus and a compressor are incorporated only one unit, such a conventional system does not include any coolant flow switching valve and any coolant branch tube. Accordingly, when the cold of ice is used, like the case of the conventional ice regenerative air conditioner shown in FIG. 1, it is required to add a heat exchanger and a coolant drive device or to use two heat exchanger at the same time. Therefore, the peak-shifted operation only can be performed. Although this peak-shifted operation has an advantage to reduce an electric power consumption equals to the amount of ice, so that it is difficult to use the whole amount of ice when the load of a cooling operation is small. This is a problem.

Moreover, in the case of the ice regenerative air conditioner as shown in FIG. 2A, because the heating rate of water flowing into the heat exchanger 111 is controlled by closing the expansion valve 110 placed at the front side of the heat exchanger 111 used for heating the water by the coolant, the system can operate only the operation mode in which almost all amount of heating becomes a part of condensed heat such as the enthalpy chart as shown in FIG. 2B. Therefore the Cost Of Performance (C.O.P.) becomes decreased. In order to avoid this drawback, there is a technique disclosed in the Japanese Laied-open patent application No. 5-25226, in which only a accumulated heat obtained in a cooling cycle according to increase of a supper-cooling rate of the coolant is used. However, when water is used as a heat storage material, it is difficult to generate a super-cooled water in stability only by a heating value of the water. This is also a problem.

On the other hand, when both the two heat exchangers are used at the same time, because the maximum required heating value during the cold of ice is used is usually about two times of a required heating value during refrigerating operation, the required heating values between the refrigerating process and the cold of ice using process is different to each other. In addition, a temperature difference between a coolant and water while the cold of ice is used becomes approximately five times of that of the refrigerating process. Thereby, because a condensed pressure during the use of ice becomes lower and lower, the COP of the cooling cycle can not increased even if the cold of ice is used.

SUMMARY OF THE INVENTION

The present invention is invented in order to avoid and overcome the conventional drawbacks described above, therefore, an object of the present invention is to provide an ice regenerative air conditioner of a compact type which can be connected to air conditioner systems used for a small sized or a medium sized conventional building and which is capable of decreasing the amount of heating value required for generating super-cooled liquid in stability and of improving the cost of performance of the refrigerating operation.

In accordance with a preferred embodiment of the present invention, there is provided an ice regenerative air conditioner system for generating ice by using a super-cooled liquid and for accumulating said ice, which comprising: an outdoor heat exchanger for exchanging heat between outside air and a coolant gas in order to compress said coolant gas to a coolant; a plurality of indoor heat exchangers for exchanging heat between indoor air and said coolant in order to cool said indoor air; a first heat exchanger placed against said plurality of indoor heat exchangers in series for heating a cooled-liquid by exchanging heat between said cooled-liquid and said coolant supplied from said outdoor heat exchanger; a second heat exchanger placed against said plurality of indoor heat exchangers in parallel for generating a super-cooled liquid by exchanging heat between said coolant and said cooled-liquid heated by said first heat exchanger; an ice storage tank connected to said first heat exchanger and said second heat exchanger for generating and accumulating said ice. Thus, in this preferred embodiment, at the first heat exchanger placed in series to the indoor heat exchanger, the cooled liquid supplied from the ice storage tank is heated by exchanging heat between the cooled liquid from the ice storage tank and the coolant supplied from the outdoor heat exchanger. Then, in the second heat exchanger placed in parallel to the indoor heat exchangers, the super-cooled liquid is generated by exchanging the coolant and the cooled liquid which has been heated by the first heat exchanger. Thereby, during the ice accumulation operation mode, after the first heat exchanger heats the cooled liquid, this cooled liquid is further cooled in order to generate the super-cooled liquid by the second heat exchanger, and the super-cooled liquid flows into the ice storage tank to generate ice. On the other hand, during the base load cooling operation mode, the coolant flows into the indoor heat exchangers through the first heat exchanger from the outdoor heat exchanger in order to form a cooling cycle and to cool the indoor air. In addition, during the peak shifted cooling operation mode, in addition to the base load cooling operation mode, the second heat exchanger is used as a coolant amount adjustment tank in order to decrease the amount of the coolant in the cooling operation cycle.

In addition, in the ice regenerative air conditioner system described above, the first heat exchanger and the second heat exchanger are placed into one unit. Thus, by placing the first and second heat exchangers into one unit, it can be applicable to connect each independent air conditioner system.

Further, in the ice regenerative air conditioner system described above, the second heat exchanger is not used or used according to a cooling operation load during the base load cooling operation mode. Thus, in the case of the base load cooling operation mode, the cooled liquid can be super-cooled up to adequately super-cooled level by selecting the use of the second heat exchanger according to the cooling operation load.

Moreover, in the ice regenerative air conditioner system described above, during the peak-shifted operation mode, the second heat exchanger is selectively used according to the cooling operation load and the heat storage amount. Thus, during the peak-shifted operation mode, the area of heat exchanger is increased by selectively using the second heat exchanger according to the cooling operation load and the heat storage amount.

Furthermore, in the ice regenerative air conditioner system described above, the first heat exchanger comprises two heat exchangers which are connected with a coolant tube to each other. The coolant tube has a branch coolant circuit or path connected to a coolant flow amount control valve which is connected to the second heat exchanger. Thus, because the first heat exchanger comprises the two heat exchangers which are connected to each other with the coolant tube having the branch coolant circuit or path to the coolant flow amount control valve which is connected to the second heat exchanger, the coolant liquid is super-cooled until it has an adequate super-cooled level.

Moreover, the ice regenerative air conditioner system described above, further comprises a coolant flow path switching valve for switching the coolant flow path between the first heat exchanger and the indoor heat exchangers. During the ice accumulation operation mode for generating the ice in the ice storage tank, the operation of the coolant flow path switching valve is controlled based on the temperature of the outlet side of the ice storage tank. Thus, because the coolant flow path switching valve for switching the coolant flow path is located between the first heat exchanger and the indoor heat exchangers and the coolant flow path switching valve is controlled based on the temperature of the ice storage tank during the ice accumulation operation mode, the rate of the condensed heat in the heat exchange amount in the first heat exchanger can be decreased by turning back the coolant into the ice accumulation cycle.

In addition, in the ice regenerative air conditioner system described above, the cooled-liquid is made up of an ethyleneglycol of not more than 80 wt % or a proplyenglycol of not more than 0.8 wt % in addition to water. Thus, because the cooled-liquid is made up of an ethyleneglycol of not more than 0.8 wt % or a proplyenglycol of not more than 0.8 wt % in addition to water, the stability of generation of the super-cooled liquid becomes high.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing control states of each valve incorporated in the ice regenerative air conditioner system of the embodiment 1 as shown in FIG. 3.

FIG. 7 is a diagram showing control states of each valve incorporated in the ice regenerative air conditioner system of the embodiment 2 as shown in FIG. 6.

DESCRIPTION OF THE PREFERRED EMBODIMENTS

Hereinafter, an ice regenerative air conditioner system as preferred embodiments according to the present invention will be explained with reference to the accompanying drawings.

Embodiment 1.

Figure 1:
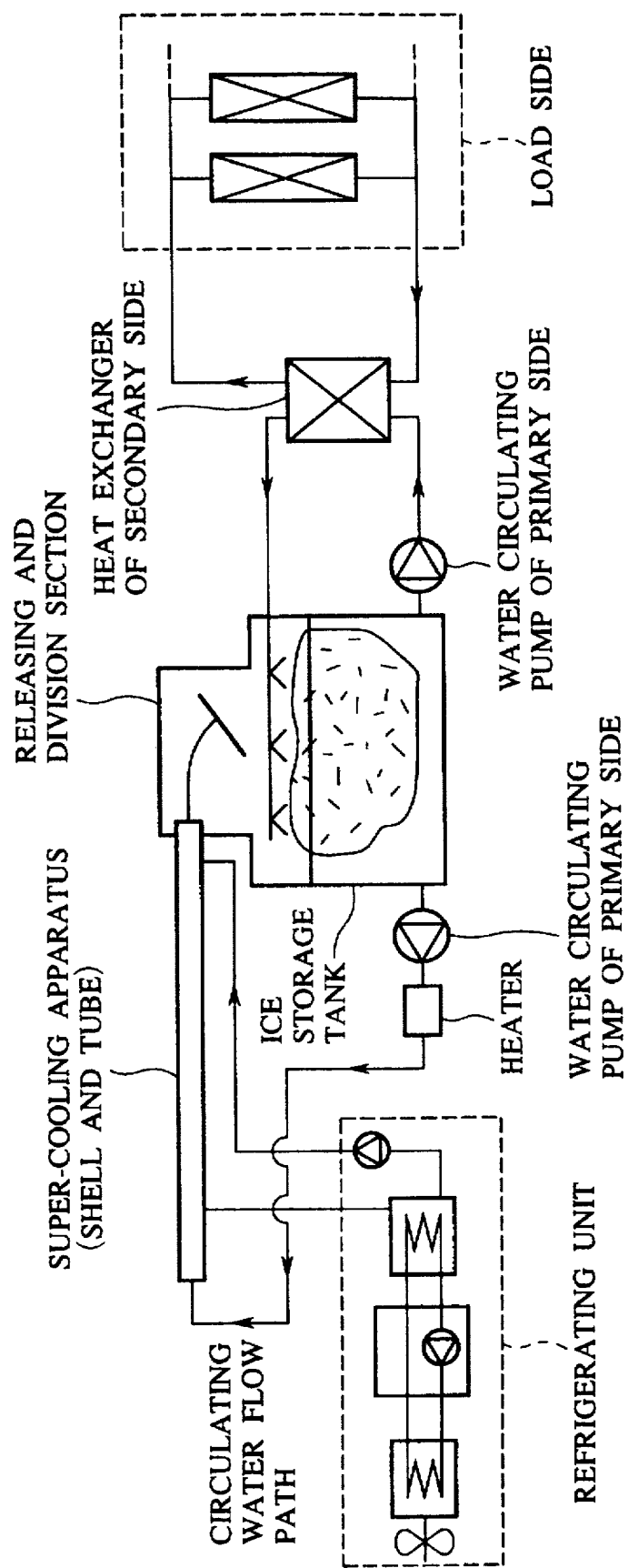
FIG. 1 is a diagram showing a configuration of a conventional ice regenerative air conditioner system.
Figure 2A:
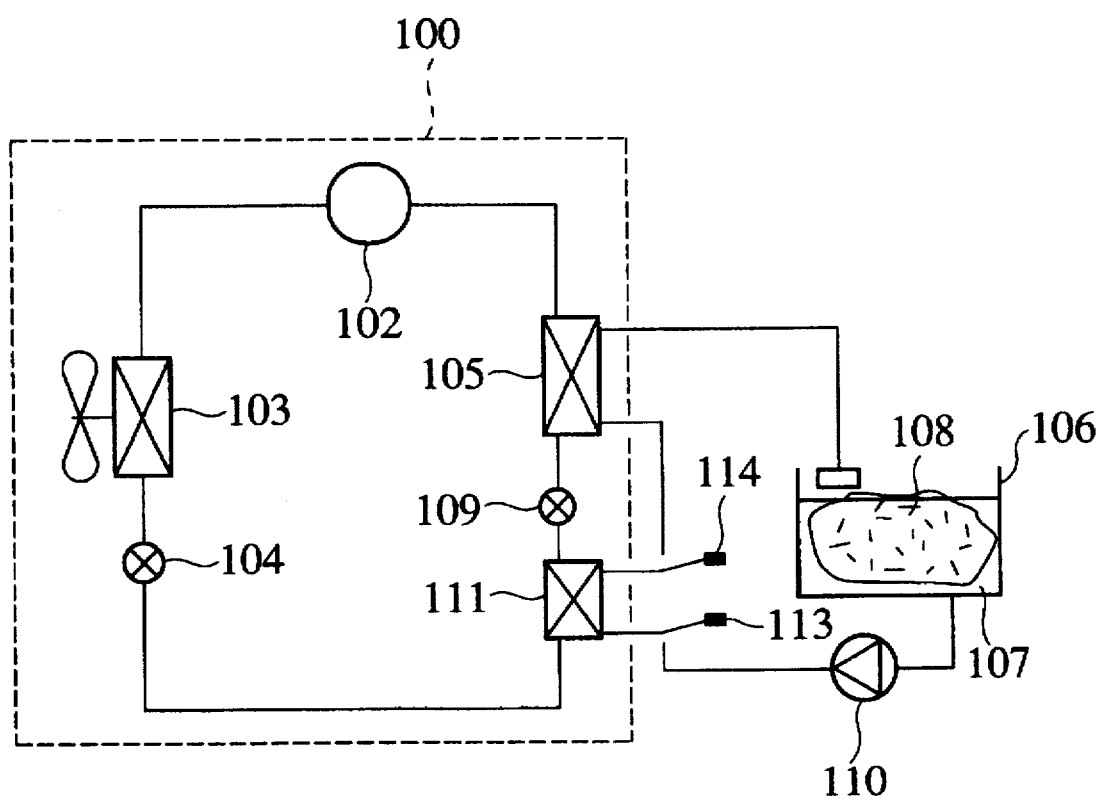
FIG. 2A is a diagram showing a configuration of a conventional ice regenerative air conditioner system.
Figure 2B:
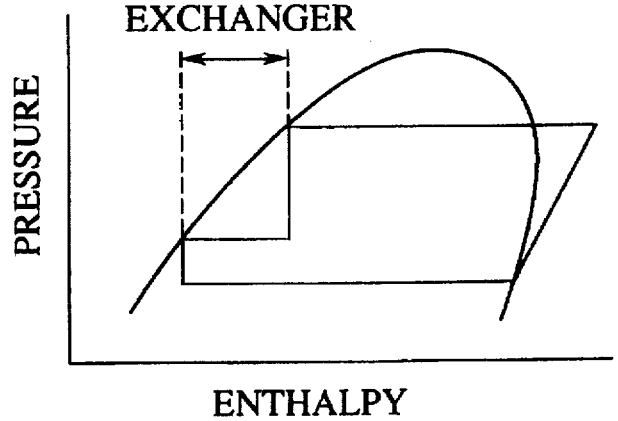
FIG. 2B is a diagram showing a pressure-enthalpy chart.
Figure 3:
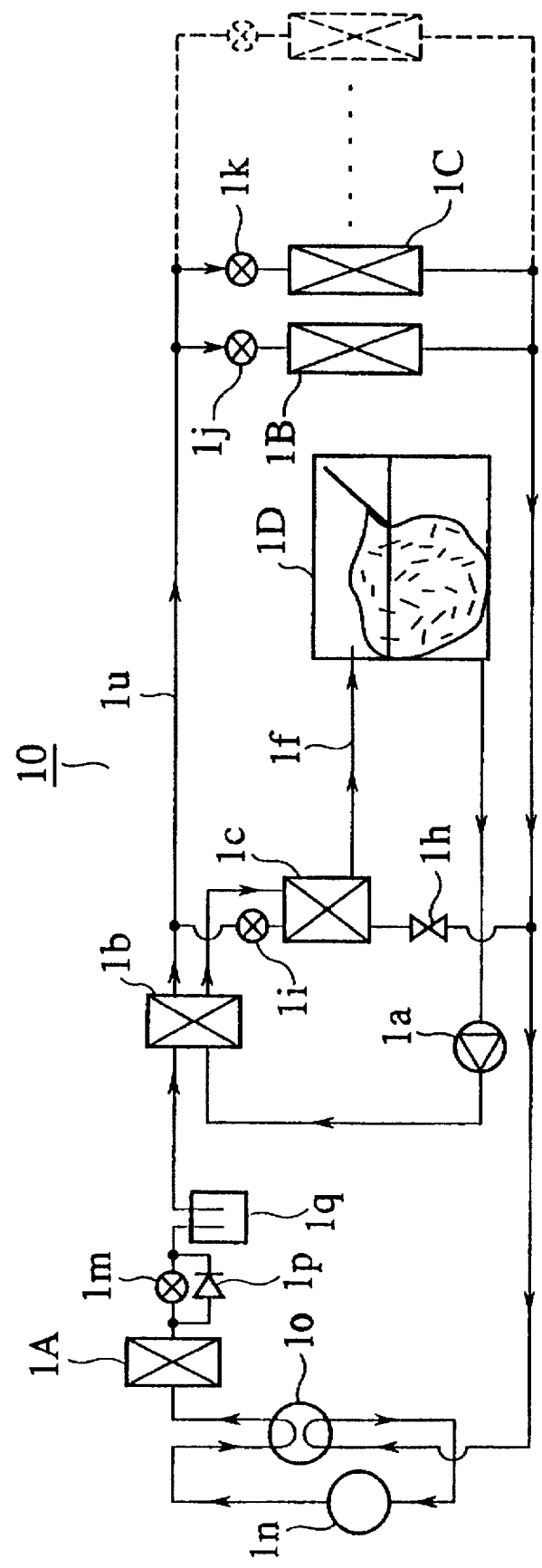
FIG. 3 is a diagram showing a configuration of an ice regenerative air conditioner system as the embodiment 1 according to the present invention.

An ice regenerative air conditioner system 10 as the first embodiment of the present invention will be explained with reference to FIGS. 3 to 5. In FIG. 3, a coolant flow in a coolant circuit and a water flow in a water circuit are designated by arrows.

FIG. 3 is a diagram showing a configuration of the ice regenerative air conditioner system 10 as the embodiment 1 according to the present invention.

As shown in FIG. 3, the water circuit (in which the water or the aqueous solution is circulated for generating ice in a sherbet state) in the ice regenerative air conditioner system 10 comprises a pump $1a$, a heat exchanger $1b$ used for heating the water, a super-cooling apparatus $1c$, an ice storage tank $1D$, and a heat exchanger tube $1f$.

On the other hand, the coolant circuit in the ice regenerative air conditioner system 10 comprises a coolant flow path switching valve $1h$, coolant flow amount control valves $1i$, $1j$, $1k$ and $1m$, a compressor $1n$, a four-way valve $1o$, a check valve $1p$, a receiver $1q$ for receiving the coolant, an outdoor heat exchanger $1A$, indoor heat exchangers $1B$ and $1C$ as an indoor unit, and a tube path $1u$ for connecting these components described above.

In the ice regenerative air conditioner system 10 having the configuration described above, the heat exchanger $1b$ (it is also referenced to as "a first heat exchanger) for heating the liquid such as a water or an aqueous solution (various kinds of aqueous solutions will be explained in another embodiment later) is connected to the indoor heat exchangers $1B$ and $1C$ in series. In addition, the super-cooling apparatus is connected to the indoor heat exchangers $1B$ and $1C$ in parallel. This configuration is one of important features of the present invention.

FIG. 4 is a diagram showing control states of each valve incorporated in the ice regenerative air conditioner system 10 of the embodiment 1 as shown in FIG. 3.

As shown in FIG. 4, during the ice accumulation operation mode for accumulating the ice in the ice storage tank $1D$, the heat exchanger $1b$ and the super-cooling apparatus $1c$ are selectively used under the following condition:

The coolant flow switching valve $1h$ is open; Both the coolant flow amount control valves $1j$ and $1k$ are closed; and the opening level of the coolant flow amount control valve $1i$ is controlled.

Here, during the ice accumulation operation mode, in the water circuit (in which the water or aqueous solution from the ice storage tank $1D$ is circulated), the pump $1a$ is in an active state, namely operates. In the coolant circuit, the condensed coolant which is compressed by the compressor $1n$ flows to the heat exchanger $1b$ through the four-way valve $1o$, the outdoor heat exchanger $1A$, the coolant flow amount control valve 1m and the receiver 1q. At the heat exchanger 1b, the water or the aqueous solution supplied from the ice accumulation tank 1D is heated by exchanging heat between the aqueous solution and the coolant. In addition, the coolant flows to the super-cooling apparatus 1c through the coolant flow amount control valve 1i. In the super-cooling apparatus 1c, the water or the aqueous solution is super-cooled, namely it becomes the super-cooled aqueous solution. The super-cooled water or the super-cooled aqueous solution flows into the ice accumulation tank 1D. On the other hand, the coolant then flows to the compressor in through the coolant flow path switching valve 1h and the four-way valve 1o.

Furthermore, during the cooling operation mode (or a base load operation mode), as shown in FIG. 4, the heat exchanger 1b is used under the following condition:

The coolant flow switching valve 1h and the coolant flow amount control valve 1i are closed; and The openings of both the coolant flow amount control valves 1j and the coolant flow amount control valve 1k are controlled.

Here, in the water circuit (in which the water or the aqueous solution is circulated for generating ice including ice in a sherbet state) during the cooling operation mode (the base load operation mode), the pump 1a operates. On the other hand, in the coolant circuit, the coolant compressed by the compressor in flows to the indoor heat exchangers 1B and 1C through the four-way valve 1o, the outdoor heat exchanger 1A, the coolant flow amount control valve 1m and the receiver 1q. The heat exchange operation is performed in the indoor heat exchangers 1B and 1C between the coolant and indoor air. Then, the coolant flows to the compressor in through the four-way valve 1o.

Further, during the cooling operation mode (the peak-shifted operation mode), the control of the opening level of the coolant flow amount control valve 1i is used in addition to the control of the base load operation mode described above. Thereby, the super-cooling apparatus 1c is used as a coolant amount adjusting tank in the cooling cycle in the coolant circuit. Therefore the coolant amount in the coolant circuit (namely, in a cooling operation cycle circuit) can be decreased by using the super-cooling apparatus 1c.

Figure 5:
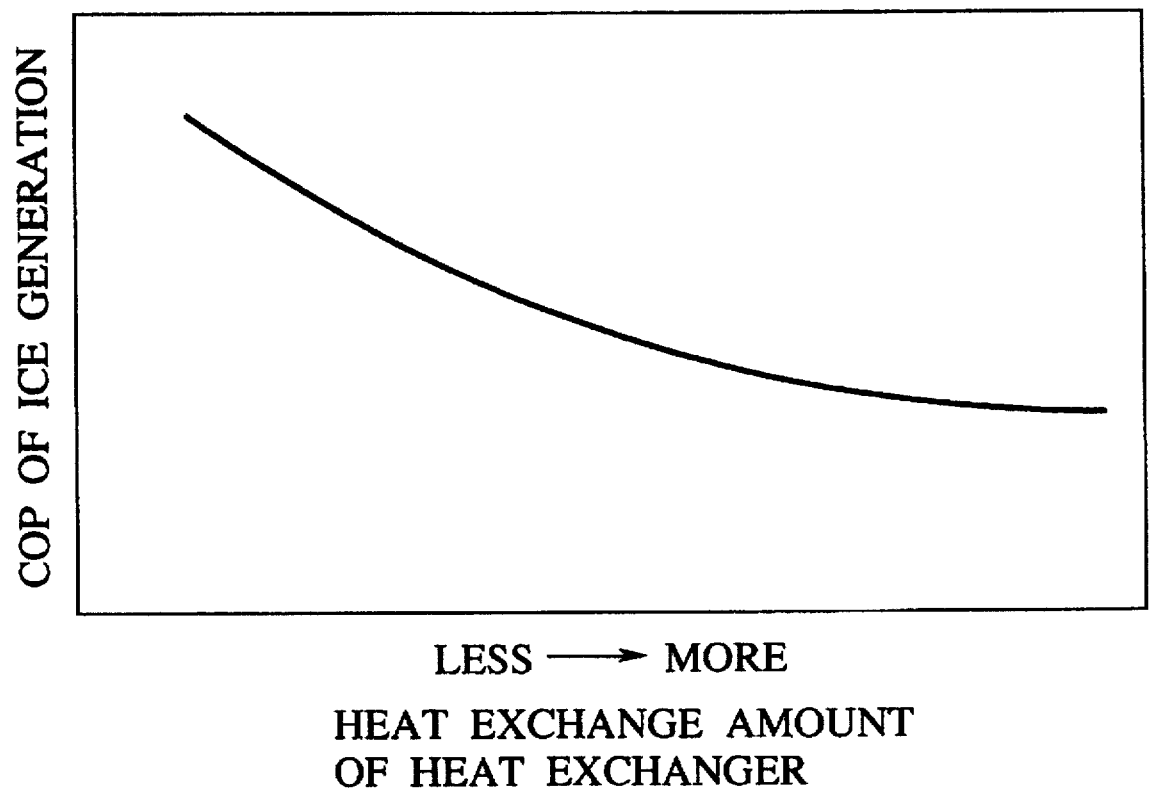
FIG. 5 is a diagram showing a relationship between a cost of performance of ice generation and heat exchange amount of a heat exchanger in the ice regenerative air conditioner system of the embodiment 1 as shown in FIG. 3.

FIG. 5 is a diagram showing a relationship between a cost of performance of ice generation and heat exchange amount of the heat exchanger in the ice regenerative air conditioner system 10 of the embodiment 1 as shown in FIG. 3.

Because the super-cooling apparatus 1c as the coolant amount adjusting tank which is incorporated against the indoor heat exchangers 1B and 1C in parallel is used regardless of the use of the indoor heat exchangers 1B and 1C, the peak-shifted operation mode or cycle during the cooling operation mode can be shifted smoothly from the base load operation mode or cycle by decreasing the amount of the coolant in the coolant circuit and by using the super-cooled apparatus 1c as the coolant amount adjusting tank during the cooling operation mode according to the cooling operation load and the amount of ice accumulated in the ice storage tank 1D, in addition to the base load operation in which the heat exchanger 1b connected to the indoor heat exchangers 1B and 1C in series is only used.

Figure 8:
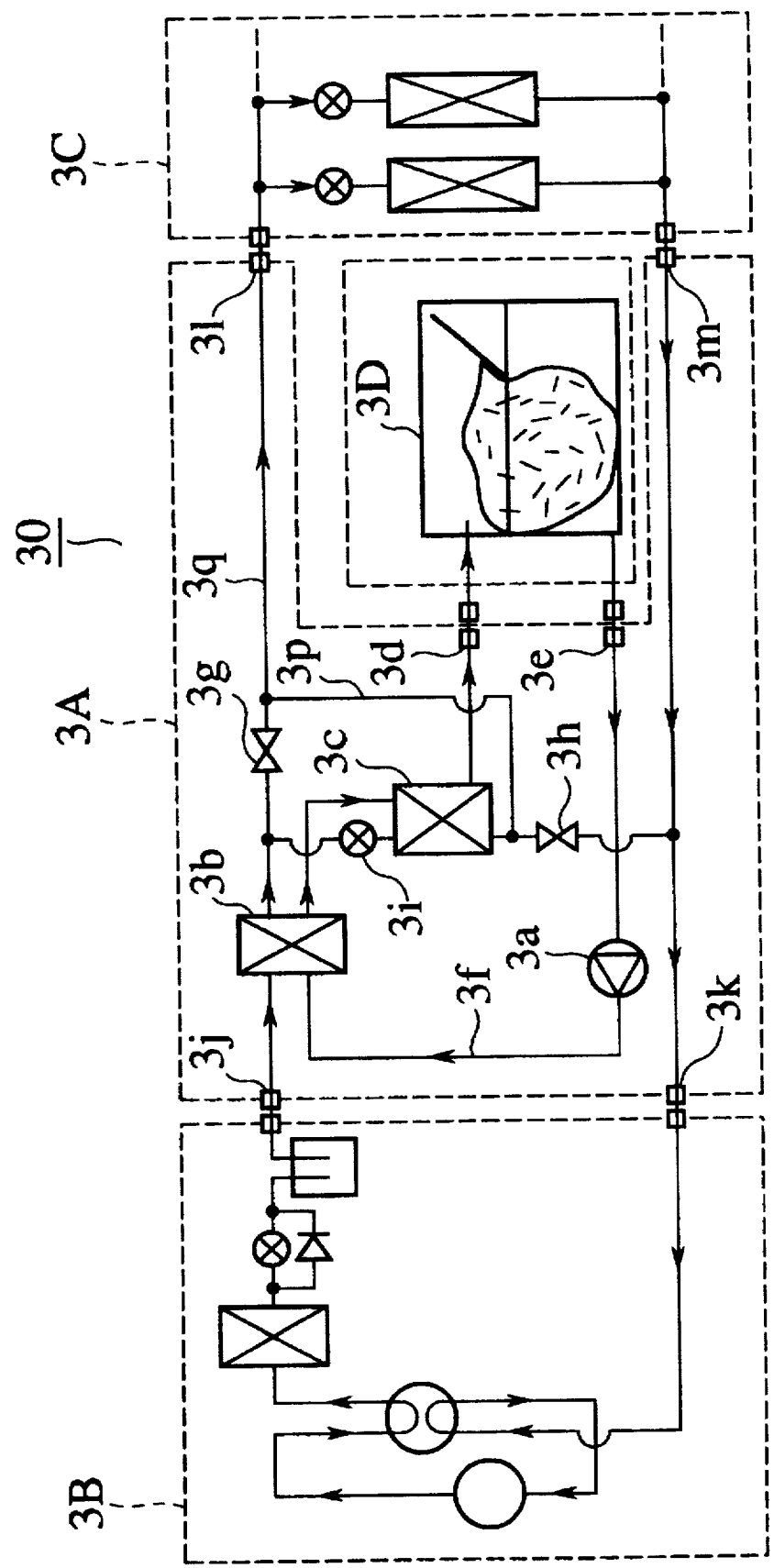
FIG. 8 is a diagram showing a configuration of an ice regenerative air conditioner system as the embodiment 3 according to the present invention.

On the other hand, during the operation mode such as the ice accumulation operation mode in which the super-cooling apparatus 1c only is used, because the indoor heat exchangers 1B and 1C are used with freedom and the indoor heat exchangers 1B and 1C as the indoor unit are used as the coolant amount adjusting tank during the ice generation operation mode for generating the ice, the amount of the coolant can be adjusted. Thereby, the heat exchange amount in the super-cooling apparatus 1c can also be controlled. Because this control operation is executed by changing the amount of the coolant, to add the condensed heat into the amount of the heat exchange is easily controlled with freedom, and the cold accumulation operation can be easily controlled according to the amount of ice in the ice storage tank 1D. As shown in FIG. 8, the amount of the heat exchange can be increased by adding the condensed heat and the super-cooled liquid can be generated in stability. However, in this case, the COP (Cost Of Performance) becomes lower during the ice generation operation mode.

As described above, in the ice regenerative air conditioner system 10 of the embodiment 1, the cooled-liquid supplied from the ice storage tank 1D is heated in the heat exchanger 1b (the first heat exchanger) connected against the indoor heat exchangers 1B and 1C in series by exchanging heat between the coolant supplied from the outdoor heat exchanger 1A and the cooled-liquid. Next, the super-cooled liquid is generated in the super-cooling apparatus 1c (the second heat exchanger) connected against the indoor heat exchangers 1B and 1C by exchanging heat between the cooled-liquid heated and coolant. Then, during the ice generation operation mode, the cooled-water is super-cooled by the super cooling apparatus 1c (the second heat exchanger) into the super-cooled state after the cooled-liquid is heated by the heat exchanger 1b (first heat exchanger). The ice is accumulated in the ice storage tank 1D. On the other hand, during the base load cooling operation mode, the indoor air is cooled by forming the cooling cycle circuit by flowing the coolant into the indoor heat exchangers 1B and 1C through the outdoor heat exchanger 1A and the heat exchanger 1b. Furthermore, during the peak-shifted operation mode, in addition to the operation in the base load operation mode described above, the amount of the coolant in the cooling operation cycle circuit can be decreased by controlling the amount of the coolant flow from the heat exchanger 1b to the super-cooling apparatus 1c (the second heat exchanger). Thereby, the super-cooled liquid can be formed in stability and the base load cooling operation and the peak-shifted cooling operation can be performed by using the cold of the ice efficiently. In addition, the amount of heat required for generating the super-cooled liquid stability can be reduced and the COP in the ice generation operation mode can be improved.

Embodiment 2.

Figure 6:
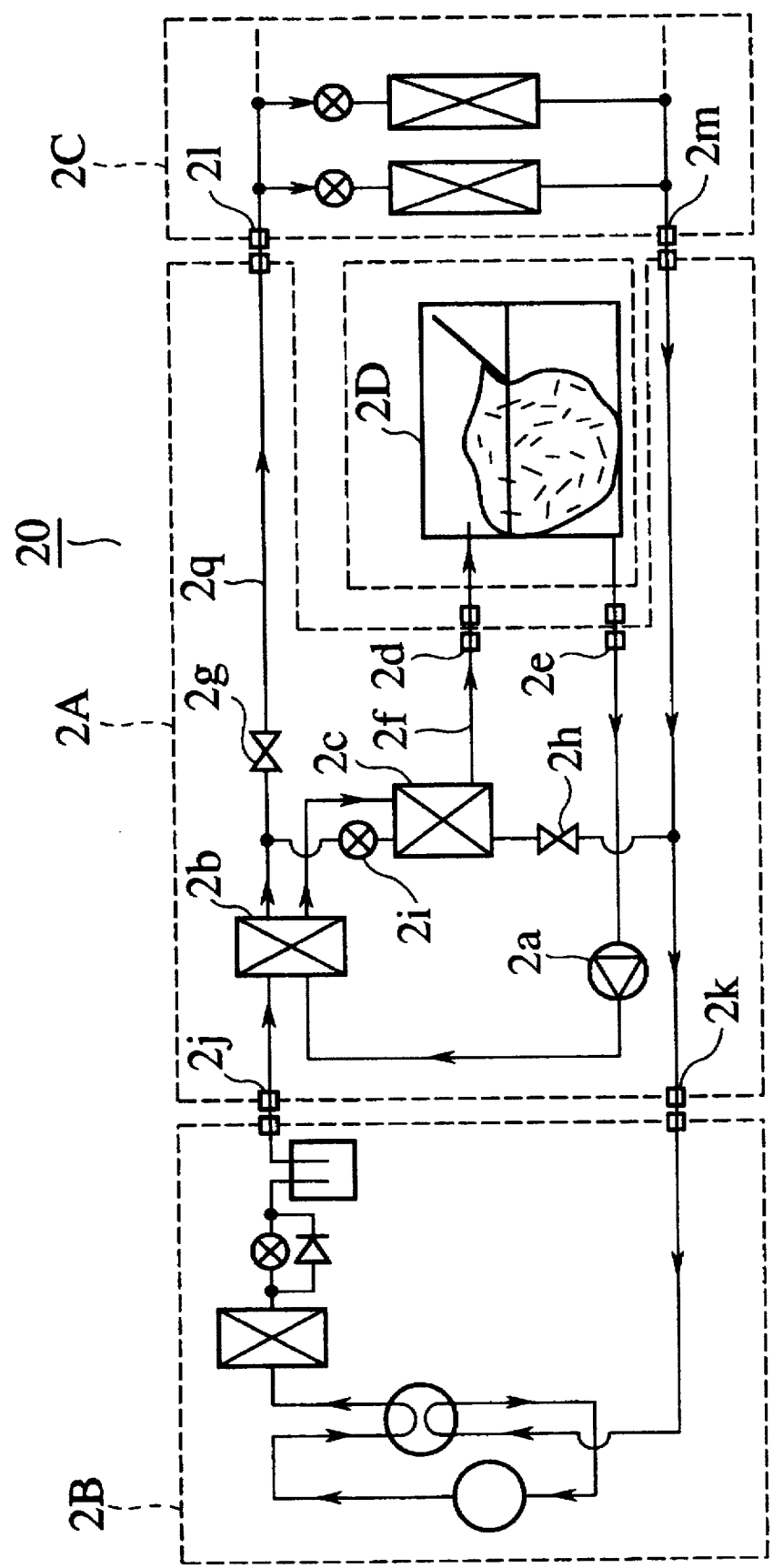
FIG. 6 is a diagram showing a configuration of an ice regenerative air conditioner system as the embodiment 2 according to the present invention.

The ice regenerative air conditioner system 20 as the embodiment 2 of the present invention will be explained with reference to FIGS. 6 and 7. In FIG. 6, a coolant flow in a coolant circuit and a water flow in a water circuit are designated by arrows.

FIG. 6 is a diagram showing a configuration of the ice regenerative air conditioner system 20 as the embodiment 2 according to the present invention.

As shown in FIG. 6, the ice regenerative air conditioner system 20 comprises a regenerative unit 2A, an outdoor unit 2B, an indoor unit 2C and an ice accumulation unit 2D (or ice storage tank, or heat accumulation unit) 2D. In this embodiment 2, each of the outdoor unit 2B and the indoor unit 2C is an available multi-purpose air conditioner used for a building which is commercially available, namely not used for a specialized ice accumulation type unit.

In the regenerative unit 2A, the water circuit (in which a water or aqueous solution from the ice storage tank 2D is circulated) comprises a pump 2a, a heat exchanger 2b for heating a water or an aqueous solution, a super-cooling apparatus 2c, two connection means 2d and 2e which are connected to the ice storage tank 2D, and a tube path 2f through which these components above are connected. In addition, the regenerative unit 2A further has the coolant circuit comprising coolant flow path switching valves 2g and 2h, a coolant flow amount control valve 2i, a plurality of connection means 2j, 2k, 2l and 2m through which the regenerative unit 2A is connected to the outdoor unit 2B and the indoor unit 2C, a heat exchanger 2b, the super-cooling apparatus 2c and a tube path 2q through which the components above are connected.

In the ice regenerative air conditioner system 200 having the configuration described above, the heat exchanger 2b is connected to the indoor unit 2C in series, further, the super-cooling apparatus 2c is connected to the indoor unit 2C in parallel. When the coolant flow path switching valves 2g, 2h and the coolant flow amount control valve 2i are incorporated in the regenerative unit 2A. This configuration is one of important features of the present invention. By using the configuration of the embodiment 2 described above, the regenerative unit 2A can be connected to commercially available air conditioners (as the indoor unit and the outdoor unit).

FIG. 7 is a diagram showing control states of each valve incorporated in the ice regenerative air conditioner system 20 of the embodiment 2 as shown in FIG. 6.

As shown in FIG. 7, during the ice accumulation operation mode, the heat exchanger 2b and the super-cooling apparatus 2c are used under the following condition:

The coolant flow path switching valve 2g is open; The coolant flow path switching valve 2h is also open; and The opening level of the coolant flow path control valve 1i is controlled.

Here, the pump 2a operates in the water circuit (in which the water or aqueous solution from the ice storage tank 4D is circulated) during the ice accumulation operation mode, the coolant condensed by the outdoor unit 2B flows into the heat exchanger 2b through the connection means 2j. The coolant then flows to the super-cooling apparatus 2c through the coolant flow amount control valve 2i. At the super-cooling apparatus 2c, the coolant cools the water or the aqueous solution up to the super-cooled state, then flows from the super-cooling apparatus 2c into the outdoor unit 2B through the coolant flow path switching valve 2h and the connection means 2k.

In addition, during the cooling operation mode (the base load operation mode), the heat exchanger 2b is performed under the following condition:

The coolant flow path switching valve 2g is open; The coolant flow path switching valve 2h; and The coolant flow amount control valve 2i are closed.

Here, during the cooling operation mode (the base load operation mode), the coolant flow is as follows:

First, the coolant is compressed by the compressor in the outdoor unit 2B, and then the coolant flows into the heat exchanger 2b through the connection means 2j. In the heat exchanger 2b, the heat exchange is performed between the coolant and the water or the aqueous solution from the ice storage tank 2D. Then, the coolant flows into the indoor unit 2C through the coolant flow path switching valve 2g, the tube path 2q and the connection means 2l. In the indoor unit 2C, the heat exchange is performed between the coolant and the indoor air for the cooling operation. After this, the coolant flows from the indoor unit 2C into the outdoor unit 2B through both the connection means 2m and 2k.

Moreover, during the cooling operation mode (the peak-shifted operation mode), the peak-shifted cooling operation can be performed by controlling the opening level of the coolant flow amount adjusting valve 2i in addition to the control of the base load operation mode described above. In this case, the super-cooling apparatus is used as the tank for adjusting or changing the coolant amount in this cycle so that the coolant amount in the cooling cycle circuit is decreased.

Thus, because the ice regenerative air conditioner system 20 includes the first connection means 2j and 2k, the second connection means 2l and 2m and the third connection means 2d and 2e. Because the heat exchanger 2b (the first heat exchanger) and the super-cooling apparatus (the second heat exchanger) are grouped into one unit, the ice regenerative air conditioner system 20 of the embodiment 2 can be connected to commercial available air conditioner systems easily and smoothly.

Embodiment 3.

The ice regenerative air conditioner system 30 as the embodiment 3 of the present invention will be explained with reference to FIGS. 8 to 11. In these drawings, a coolant flow in a coolant circuit and a water flow in a water circuit are designated by arrows.

FIG. 8 is a diagram showing a configuration of the ice regenerative air conditioner system as the embodiment 3 according to the present invention.

As shown in FIG. 8, the water circuit (in which the water or the aqueous solution is circulated for generating ice in a sherbet state), namely an ice generation flow path circuit, in the ice regenerative air conditioner system 30 comprises a pump 3a, a heat exchanger 3b for heating a water or an aqueous solution, a super-cooling apparatus 3c, two connection means 3d and 3e which are connected to the ice storage tank 3D, and a tube path 3f through which these components above are connected. On the other hand, a regenerative unit 3A has the coolant circuit comprises coolant flow path switching valves 3g and 3h, a coolant flow amount control valve 3i, a plurality of connection means 3j, 3k, 3l and 3m through which the regenerative unit 3A is connected to the outdoor unit 2B and the indoor unit 3C, a heat exchanger 3b, the super-cooling apparatus 3c, a tube path 3q through which the components above are connected, and a bypass tube 3p.

Thus, the ice regenerative air conditioner system comprises the outdoor unit 3B, the indoor unit 3C, the ice storage tank 3D and the regenerative unit 3A. In the embodiment 3, a commercial available tank is used as the ice storage tank 3D.

Figure 9:
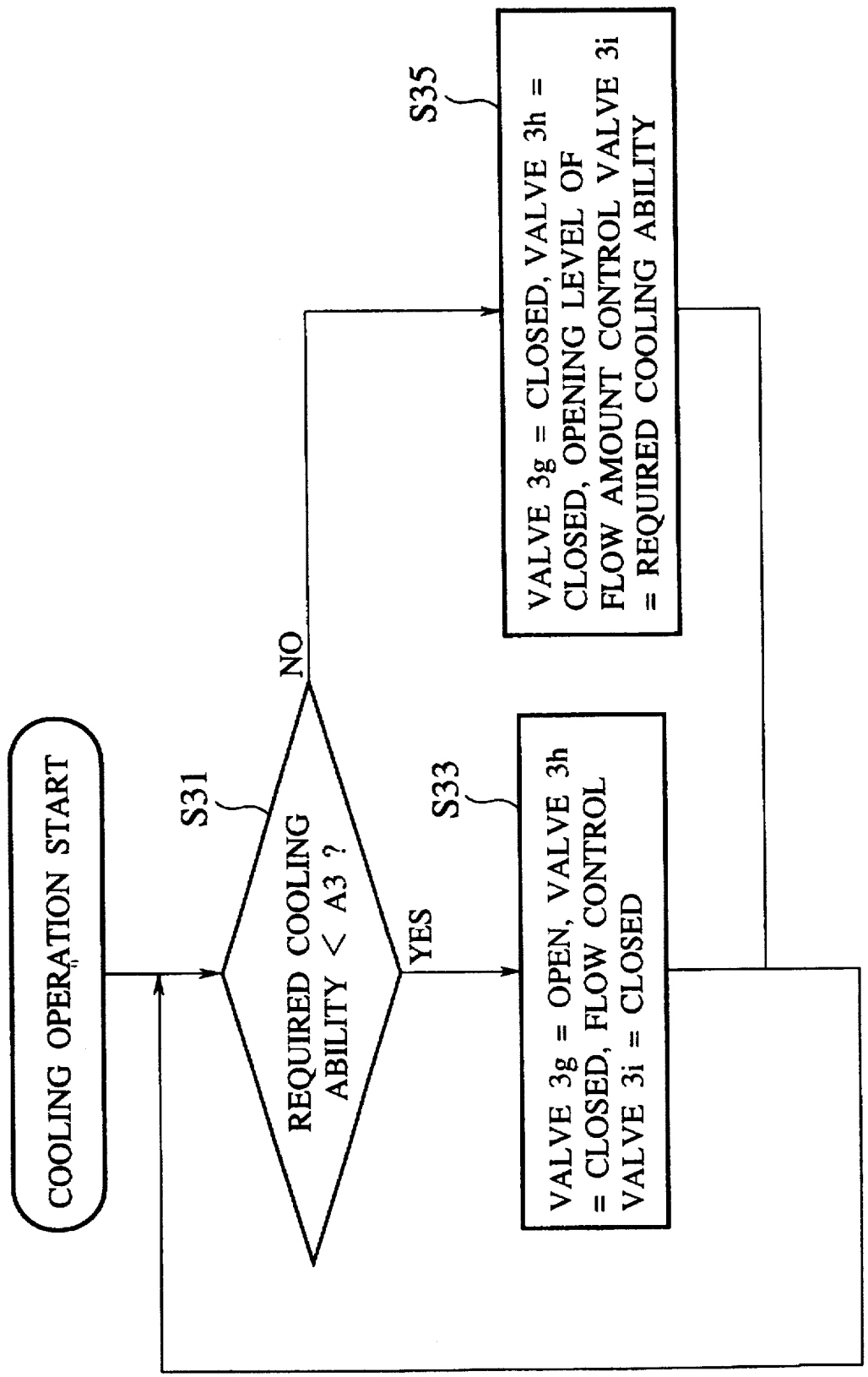
FIG. 9 is a flow chart showing the operation of a base-load cooling operation in the ice regenerative air conditioner system as the embodiment 3 as shown in FIG. 8.

Next, the flow chart of the base load cooling operation, in which the cold of ice is used for the cooling operation load of 20%, in the ice regenerative air conditioner system 30 of the embodiment 3 according to the present invention will be explained. FIG. 9 is a flow chart showing the operation of the base-load cooling operation in the ice regenerative air conditioner system 30 as the embodiment 3 as shown in FIG. 8.

First, a control means (not shown) detects whether or not a required cooling ability according to an operation temperature and an air temperature both of which are set by an operator is smaller than a specified value A3 (step S3).

When the required cooling ability<the above predetermined value A3, the coolant flow path switching valve 3g is open, the coolant flow path switching valve 3h is closed, the coolant flow amount control valve 3i is closed (step S33).

On the other hand, when the required cooling ability>the predetermined value A3, the coolant flow path switching valve 3g is closed, the coolant flow path switching valve 3h is also closed, the opening valve of the coolant flow amount control valve 3i is changed according to the required cooling operation load (step S35).

Figure 10:
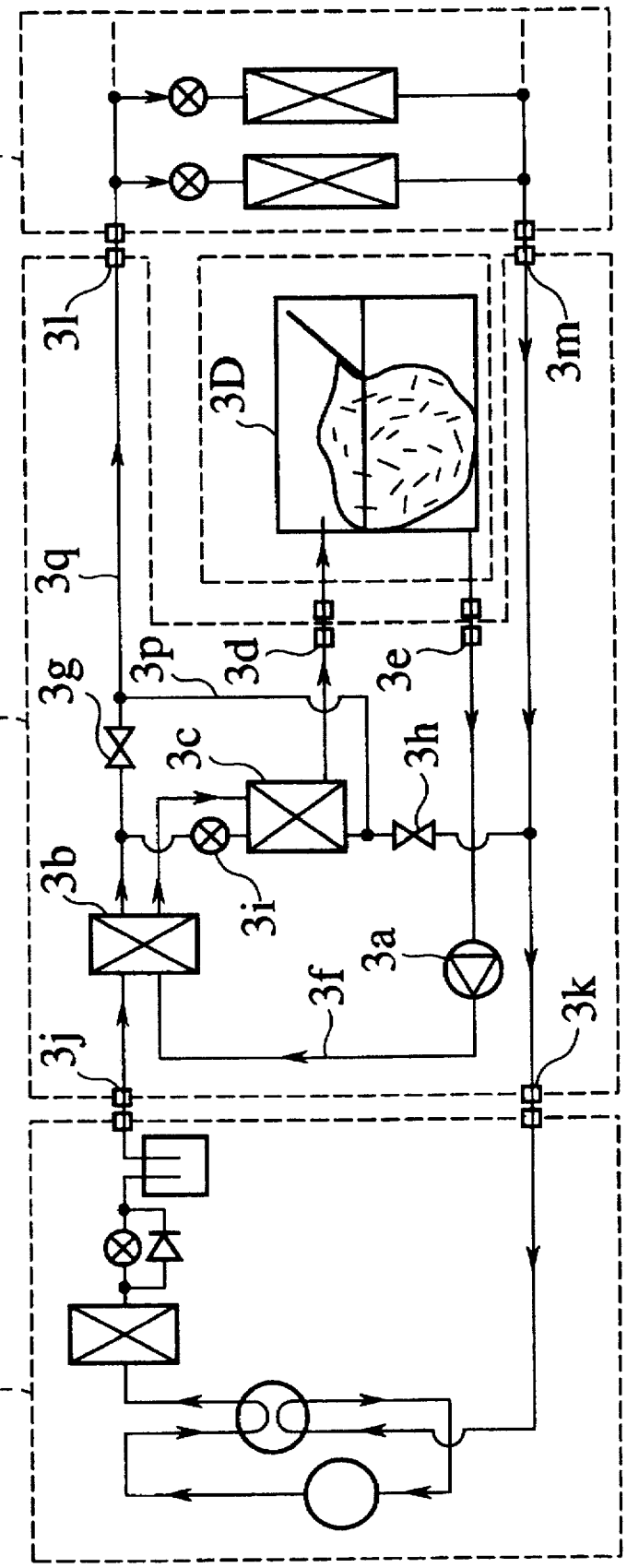
FIG. 10 is a flow chart showing the operation of a base-load 1 cooling operation in the ice regenerative air conditioner system as the embodiment 3 as shown in FIG. 8.

FIG. 10 is a flow chart showing the operation of a base-load 1 cooling operation in the ice regenerative air conditioner system as the embodiment 3 as shown in FIG. 8.

First, when the regenerative unit 3A receives a cooling operation request signal transmitted from a control means, according to the flow shown in FIG. 9, the pump 3a in the water circuit (in which the water or the aqueous solution is circulated for generating ice in a sherbet state) is performed. On the other hand, in the coolant circuit, at the step S31, when the required cooling load is small, the coolant flow path switching valve 3g is open, the coolant flow path switching valve 3h is closed, the coolant flow path switching valve 3i is also closed. Here, as shown in FIG. 10, the condensed coolant flowing from the outdoor heat exchanger in the outdoor unit 3B in which the coolant is condensed flows into the heat exchanger 3b through the connection means 3j. In this case, because the required heat amount in order to increase the super-cooled level of the water or the aqueous solution in the water circuit is small, the water or the aqueous solution in the water circuit (in which the water or the aqueous solution is circulated for generating ice in a sherbet state) is super-cooled adequately only by the heat exchanger 3b. Next, the coolant flows into the indoor unit 3C through the connection means 31 in the indoor unit 3C.

Figure 11:
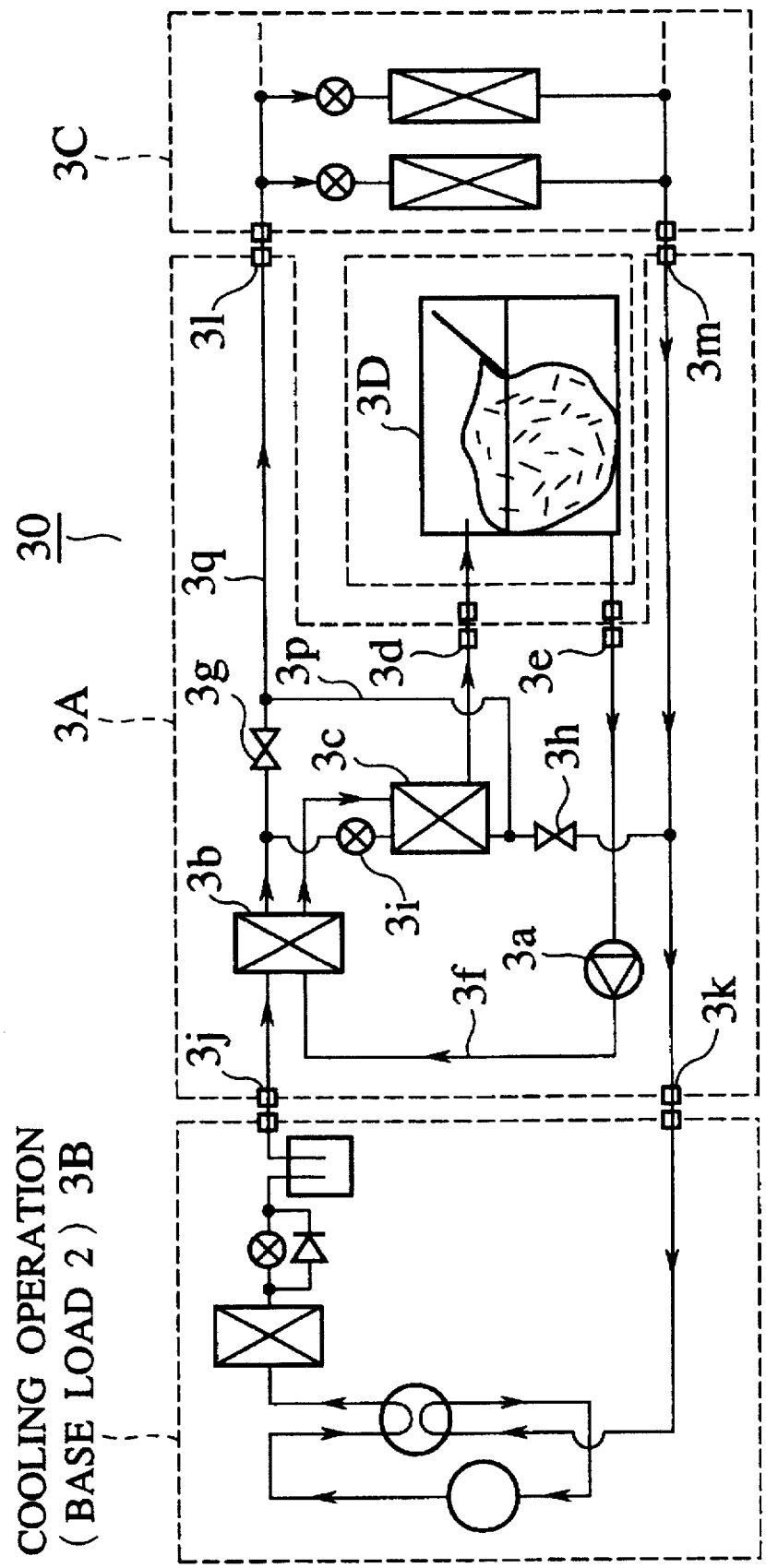
FIG. 11 is a flow chart showing the operation of a base-load 2 cooling operation in the ice regenerative air conditioner system as the embodiment 3 as shown in FIG. 8.

FIG. 11 is a flow chart showing the operation of a base-load 2 cooling operation in the ice regenerative air conditioner system 30 as the embodiment 3 as shown in FIG. 8.

In the step S31, when the required cooling load is large, the coolant flow path switching valve 3g is closed, the coolant flow path switching valve 3h is also closed, the opening level of the coolant flow amount control valve 3i is changed according to the magnitude of a required cooling load. In this cooling control operation, the cooled water or the cooled aqueous solution flows from the ice storage tank 1D, in which the ice is generated and accumulated during night, to the heat exchanger 3b and the super-cooling apparatus 3c.

Here, in the base load 2 operation mode in which the required cooling load is greater, because a required heat amount in order to increase the super-cooled level of the coolant becomes greater, the flow amount of the coolant is throttled and then the coolant is super-cooled up to the adequately super cooled level by the super-cooling apparatus 3c after the coolant is cooled slightly by the heat exchanger 3b. After this, the coolant flows into the indoor unit 3C through the connection means 31. The cooling operation is performed in the indoor unit 3C by using the coolant. Then, the coolant flows into the outdoor unit 3B through the connection means 3m and the connection means 3k.

As described above in detail, in the ice regenerative air conditioner system 30 of the embodiment 3, during the base load operation mode, the super-cooling apparatus (the second heat exchanger) is selectively used according to the cooling operation load. Thereby the coolant can be super-cooled up to the adequate super-cooled level by the super-cooling apparatus.

Embodiment 4.

The ice regenerative air conditioner system 40 as the embodiment 4 of the present invention will be explained with reference to FIGS. 12 to 15. In these drawings, a coolant flow in a coolant circuit and a water flow in a water circuit are designated by arrows.

Figure 12:
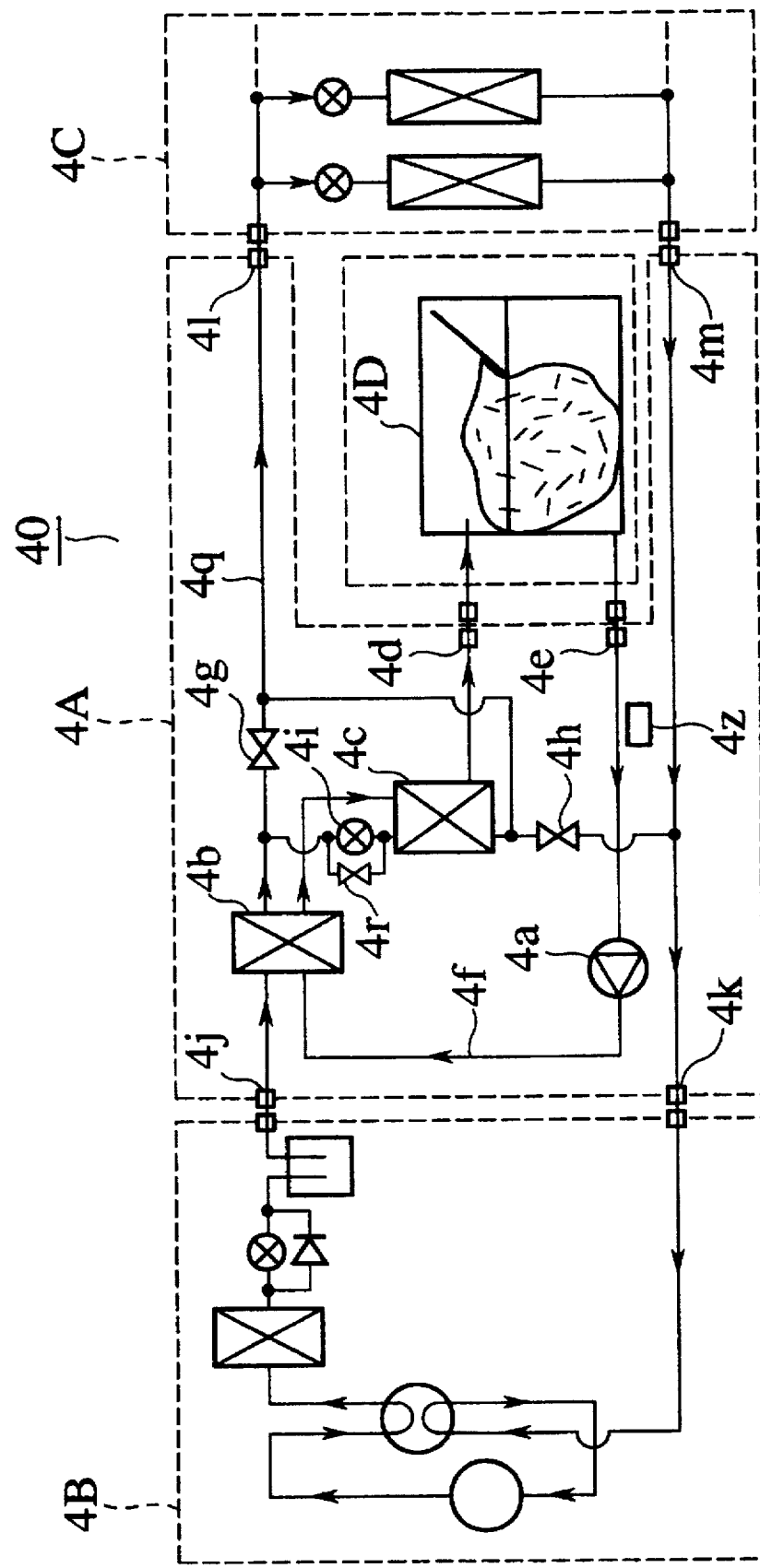
FIG. 12 is a diagram showing a configuration of an ice regenerative air conditioner system as the embodiment 4 according to the present invention.

FIG. 12 is a diagram showing a configuration of the ice regenerative air conditioner system 40 as the embodiment 4 according to the present invention.

As shown in FIG. 12, the water circuit (in which the water or the aqueous solution is circulated for generating ice in a sherbet state), namely an ice generation flow path circuit, in the ice regenerative air conditioner system 40 comprises a pump 4a, a heat exchanger 4b for heating a water or an aqueous solution, a super-cooling apparatus 4c, two connection means 4d and 4e which are connected to the ice storage tank 4D, and a tube path 4f through which the components above are connected. On the other hand, the coolant circuit in a regenerative unit 4A comprises coolant flow path switching valves 4g, 4h and 4r, a coolant flow amount control valve 4i, a plurality of connection means 4j, 4k, 4l and 4m through which the regenerative unit 4A is connected to the outdoor unit 4B and the indoor unit 4C, a heat exchanger 4b, the super-cooling apparatus 4c, a tube path 3q through which the components above are connected, and a bypass tube 4p.

Thus, the ice regenerative air conditioner system 40 comprises the outdoor unit 4B, the indoor unit 4C, the ice storage tank 4D and the regenerative unit 4A. In the embodiment 4, a commercial available tank is used as the ice storage tank 4D.

Figure 13:
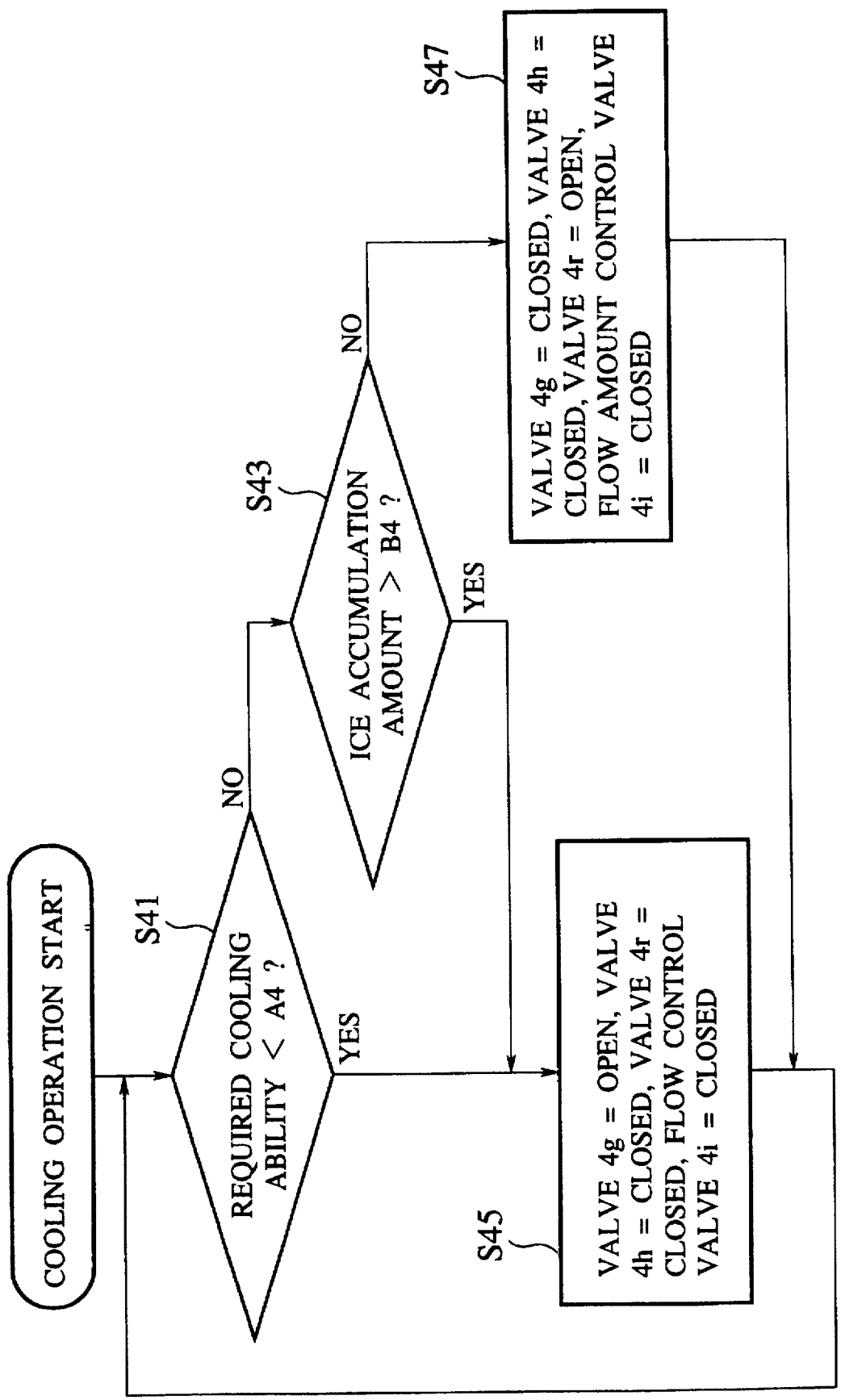
FIG. 13 is a flow chart showing the operation of a peak-shifted cooling operation in the ice regenerative air conditioner system as the embodiment 4 as shown in FIG. 12.

Next, the operation of the peak-shifted cooling operation mode of the ice regenerative air conditioner system 40 in which the cold of ice is used as the whole heat source required for the entire cooling load will be explained. FIG. 13 is a flow chart showing the operation of a peak-shifted cooling operation mode in the ice regenerative air conditioner system 40 as the embodiment 4 as shown in FIG. 12.

First, when the regenerative unit 4A receives a cooling operation request control signal, in the water circuit (in which the water or the aqueous solution circuit is circulated), the pump 4a operates, a control means (not shown) detects whether or not the required cooling ability is smaller than a predetermined value A4 according to the operation temperature which is an operator is set and an indoor temperature (or a room temperature) (step S41). A temperature sensor 4z detects the water temperature or the aqueous solution temperature lowing from the ice storage tank 4D, when the required cooling ability is greater than the predetermined value A4 (step S43). For example, when the water temperature is about 0° C., the ice storage tank is filled with ice only. In this case, the control means detect that the heat regenerative amount in the ice storage tank is larger.

Here, when the required cooling ability is smaller than the predetermined value A4 at step S41, or when the heat accumulation amount in the ice storage tank 4D is larger than the predetermined value B4, under the control means (not shown) the following operation is performed:

The coolant flow path switching valve 4g is open; The coolant flow path switching valves 4h and 4r are closed; and The coolant flow amount control valve 4i is closed (step S45).

On the other hand, when the required cooling ability is greater than the predetermined value A4 at step S41, and when the heat accumulation amount in the ice storage tank 4D (or heat accumulation tank) is smaller than the predetermined value B4, under the control means (not shown) the following operation is performed: the coolant flow path switching valves 4g and 4h are closed, the coolant flow path switching valve 4r is open and the coolant flow amount control valve 4i is closed (step S47).

Figure 14:
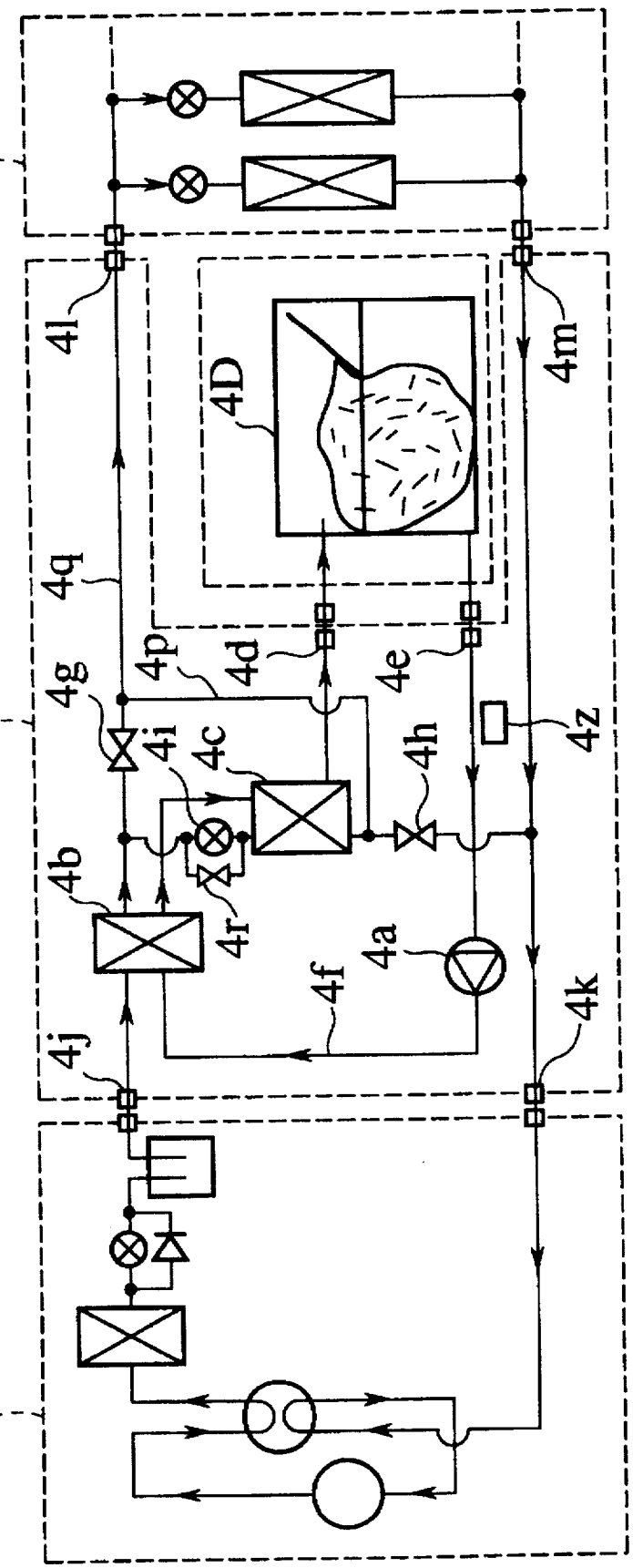
FIG. 14 is a flow chart showing the operation of a peak-shifted 1 cooling operation in the ice regenerative air conditioner system of the embodiment 4 as shown in FIG. 12.

FIG. 14 is a flow chart showing the operation of a peak-shifted 1 cooling operation in the ice regenerative air conditioner system 40 as the embodiment 4 as shown in FIG. 12.

At the step S45 shown in FIG. 13, because the coolant flow path switching valve 4g is open, the coolant flow path switching valves 4h and 4r are closed and the coolant flow amount control valve 4i is closed, the cooled-water or cooled-aqueous solution flows from the ice storage tank 4D in which the ice is generated during midnight, for example, to the super-cooling apparatus 4c. In addition, the coolant of a gas state from the outdoor unit 4B flows into the heat exchanger 4b through the connection means 4j. In the heat exchanger 4d, the coolant is completely condensed, and then the condensed coolant flows into the indoor unit 4c through the coolant flow path switching valve 4g and the connection means 4l for the indoor unit 4C. In this case, the condensed pressure of the coolant is small when the required cooling ability is also small. In addition, when the required cooling ability is greater, the condensed heat amount is also large and the heat accumulation amount in the ice storage tank 4D is greater, because the water temperature flowing from the ice storage tank 4D is low, the load of the heat exchanger 4b only becomes approximately a load value of 60% in a normal cooling operation load. Thereby, the power consumption can be decreased by using the ice regenerative air conditioner system 40 of the embodiment 4.

Figure 15:
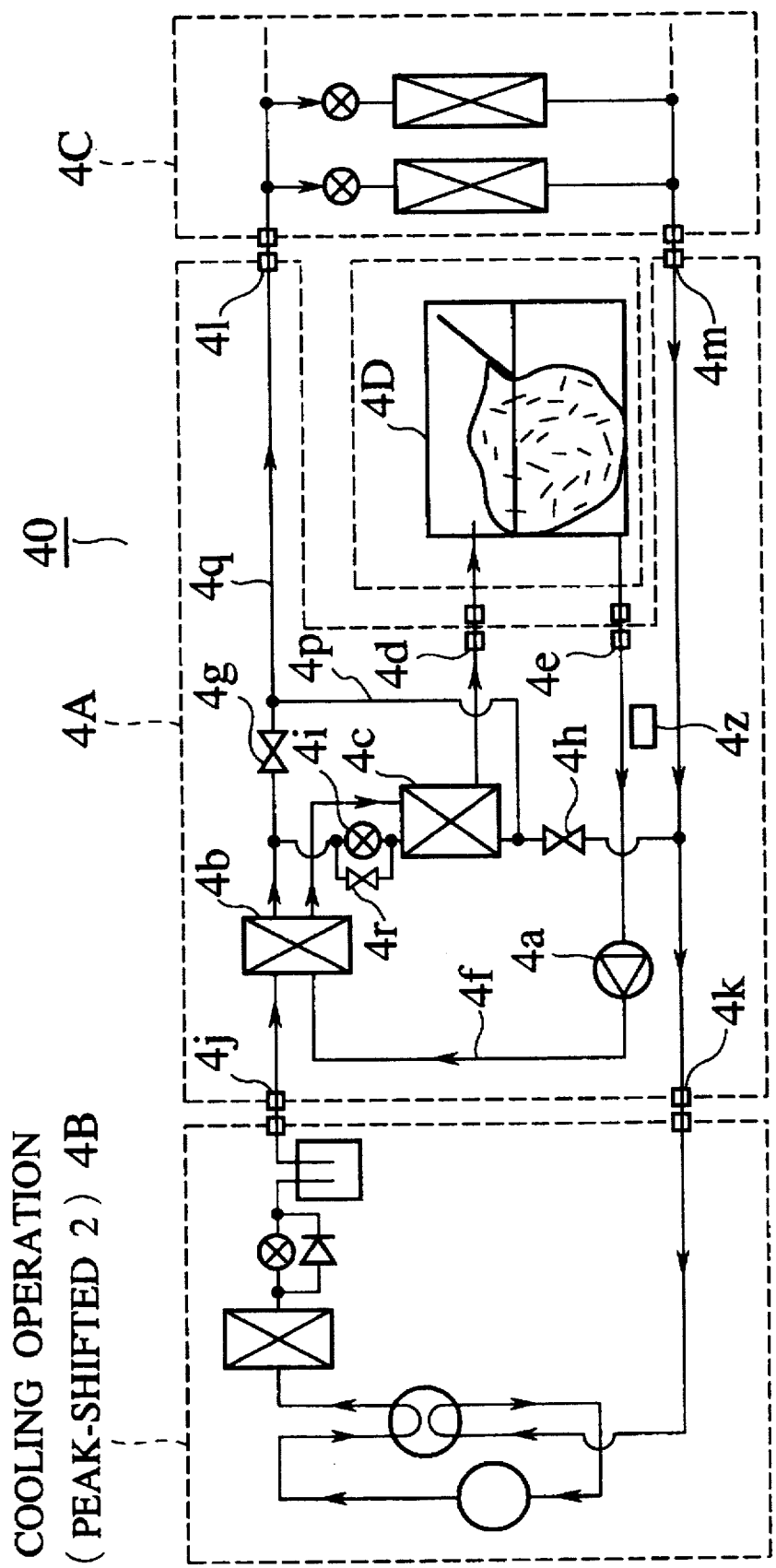
FIG. 15 is a flow chart showing the operation of a peak-shifted 2 cooling operation in the ice regenerative air conditioner system of the embodiment 4 as shown in FIG. 12.

FIG. 15 is a flow chart showing the operation of a peak-shifted 2 cooling operation in the ice regenerative air conditioner system 40 as the embodiment 4 as shown in At the step S47 shown in FIG. 13, the coolant flow path switching valves 4g and 4h are closed, the coolant flow path switching valve 4r is open and the coolant flow amount control valve 4i is closed. Accordingly, when the required cooling ability or load is large and the heat accumulation amount in the ice storage tank 4D is small, the coolant gas flowing from the outdoor unit 4B flows into the heat exchanger 4b through the connection means 4j. In the heat exchanger 4b, a part of the coolant is condensed and then the coolant flows into the super-cooling apparatus 4c through the coolant flow path switching valve 4r which is placed against the coolant flow amount control valve 4i in parallel. In the super-cooling apparatus 4c, the remained coolant gas in the coolant is compressed completely. Here, the coolant is changed into a liquid state completely. The condensed coolant flows from the super-cooling apparatus 4c into the indoor unit 4C through the bypass tube path 4p, the tube path 4q and the connection means 4l. In this case, by using the coolant flow path switching valve 4r having a smaller flow resistance, the condensed pressure at both the heat exchanger 4b and the super-cooling apparatus 4c become a same value. Accordingly, even if the cooling ability or load is greater, the condensed heat amount is large, the heat accumulation amount is small, the temperature of the water or the aqueous solution from the ice storage tank 4D is high, the heat exchanger area can be increased by using the heat exchanger 4b and the super-cooling apparatus 4c at the same time or by using both them selectively. In this case, the condensed pressure becomes down to that of approximately 60% in a normal cooling operation. Next, the coolant flowing into the indoor unit 4C vapors at the indoor unit 4C and then returns to the outdoor unit 4B through the both connection means 4m and 4j.

Thus, in the ice regenerative air conditioner system 40 of the embodiment 4, because both the heat exchanger 4b and the super-cooling apparatus 4c are used selectively or used at the same time during the peak-shifted cooling operation according to the cooling operation load and the heat accumulation amount, the heat exchange area can be increased and the condensed pressure can be reduced to approximately that of 60% in a normal cooling operation.

Embodiment 5.

Figure 16:
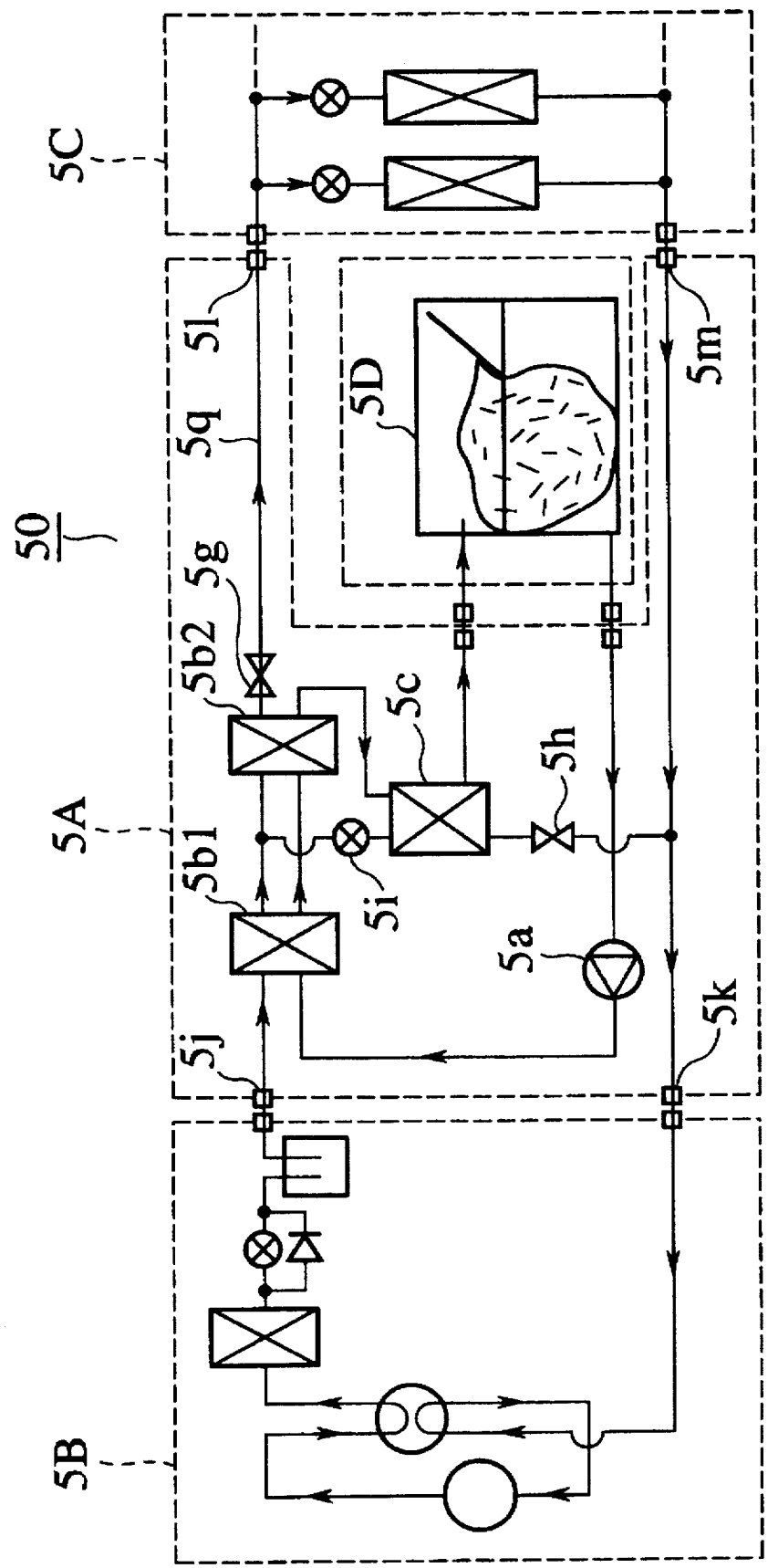
FIG. 16 is a diagram showing a configuration of an ice regenerative air conditioner system of the embodiment 5 according to the present invention.
Figure 17:
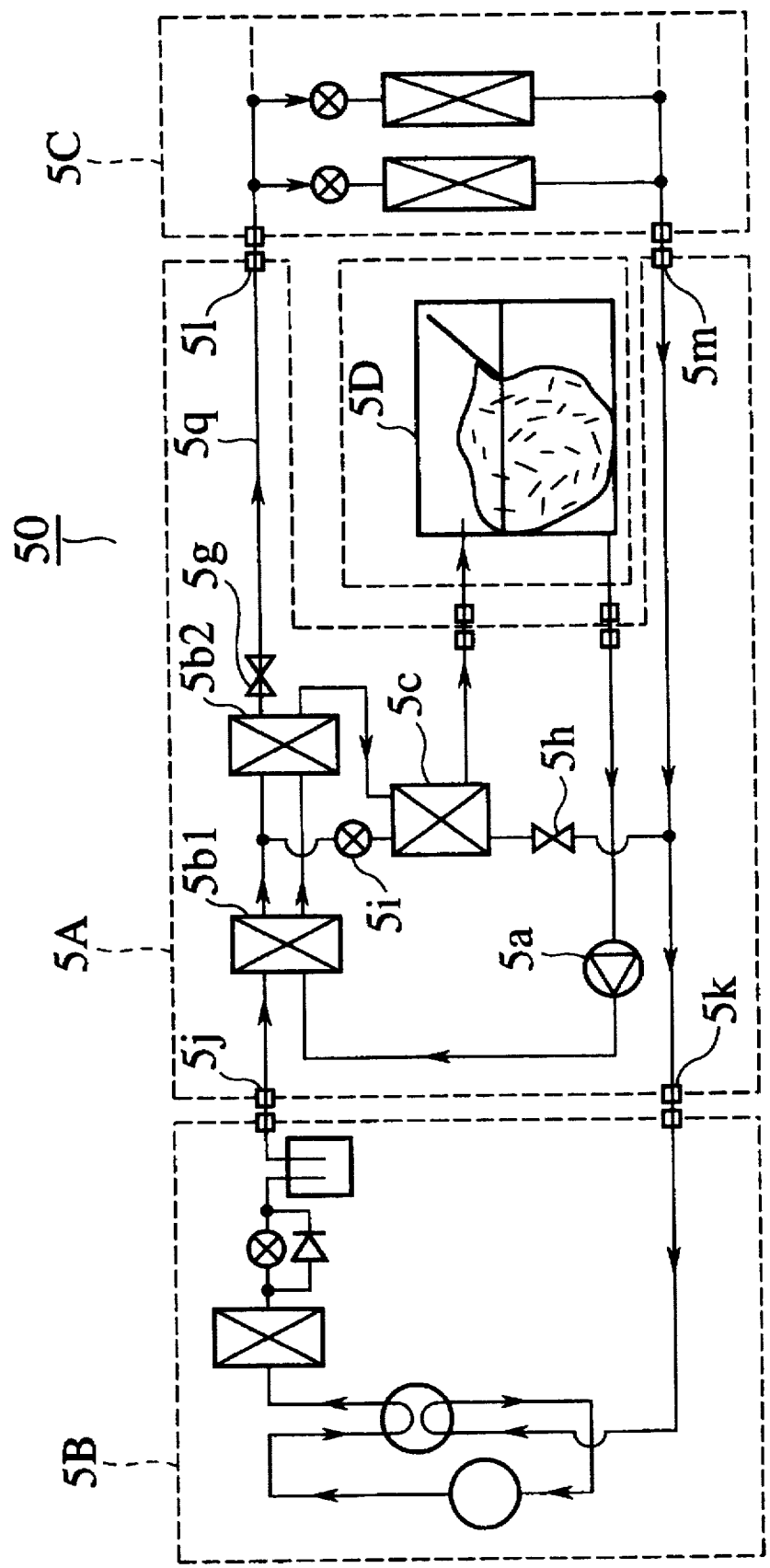
FIG. 17 is a flow chart showing the operation of a base-load cooling operation in the ice regenerative air conditioner system of the embodiment 5 as shown in FIG. 16.
Figure 18:
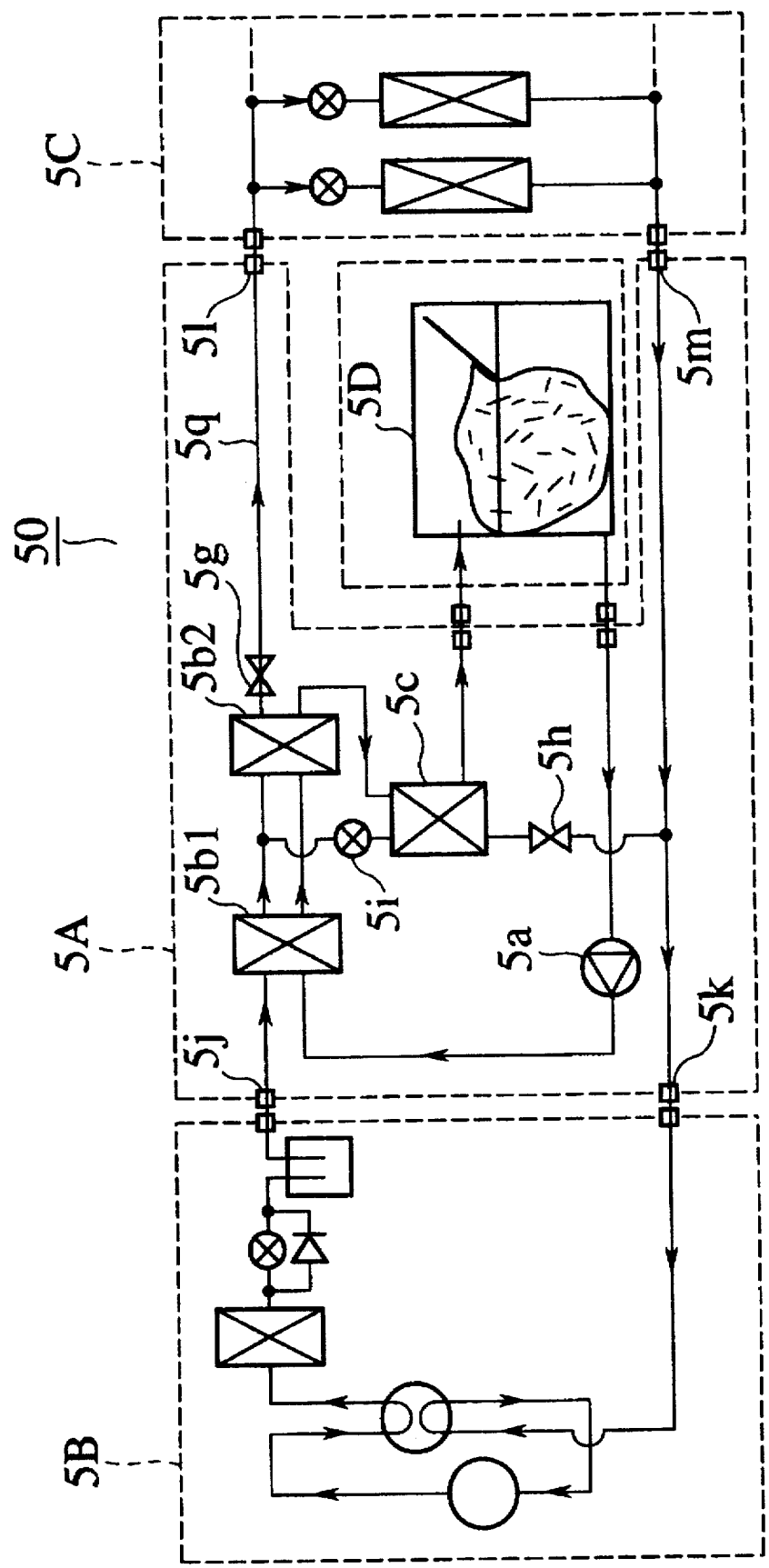
FIG. 18 is a flow chart showing the operation of another base-load cooling operation in the ice regenerative air conditioner system of the embodiment 5 as shown in FIG. 16.

The ice regenerative air conditioner system 50 as the embodiment 5 of the present invention will be explained with reference to FIGS. 16 and 18. In FIGS. 16 to 18, a coolant flow in a coolant circuit and a water flow in a water circuit are designated by arrows.

FIG. 16 is a diagram showing a configuration of the ice regenerative air conditioner system 50 as the embodiment 5 according to the present invention.

As shown in FIG. 16, the water circuit (in which the water or the aqueous solution is circulated for generating ice in a sherbet state), namely an ice generation flow path circuit, in the ice regenerative air conditioner system 50 comprises a pump 5a, a heat exchanger 5b for heating a water or an aqueous solution, a super-cooling apparatus 5c, two connection means 5d and 5e which are connected to the ice storage tank 5D, and a tube path 5f through which these components above are connected. In addition, the heat exchanger 5b further comprises two heat exchangers 5b1 and 5b2. The coolant circuit in a regenerative unit 5A comprises coolant flow path switching valves 5g and 5h, a coolant flow amount control valve 5i, a plurality of connection means 5j, 5k, 5l and 5m through which the regenerative unit 5A is connected to the outdoor unit 5B and the indoor unit 5C, a heat exchanger 5b, the super-cooling apparatus 5c, and a tube path 5q through which the components above are connected.

Thus, the ice regenerative air conditioner system 50 comprises the regenerative unit 5A, the outdoor unit 5B, the indoor unit 5C, and the ice storage tank 5D. In the embodiment 5, a commercial available tank can be used as the ice storage tank 5D.

Next, the operation of the base load cooling operation mode of the ice regenerative air conditioner system 50 in which the cold of ice is used as the heat source required for the entire cooling load of 20% will be explained.

FIG. 17 is a flow chart showing the operation of a base-load cooling operation in the ice regenerative air conditioner system 50 as the embodiment 5 as shown in When the regenerative unit 5A receives a cooling operation request signal from a control means (not shown), the pump 5a operates in the water circuit. In the coolant circuit in the regenerative unit 5A, the coolant flow path switching valve 5g is closed, the coolant flow path switching valves 5h is open and the opening level of the coolant flow amount control valve 5i is changed based on the heating degree or the vapor temperature of the cycle designated by the temperature difference between both temperature values of the inlet side and outlet side in the heat exchanger.

As shown in FIG. 17, a cooled water or a cooled aqueous solution is supplied from the ice storage tank 5D in which the ice is generated and accumulated during midnight to the heat exchangers 5b1 and 5b2 and the super-cooling apparatus 5c. On the other hand, the condensed liquid or condensed coolant condensed by the outdoor unit 5B flows into the heat exchanger 5b1 through the connection means 5j. In the heat exchanger 5b1, the condensed coolant is cooled so that the super-cooled level of the coolant becomes increased, and then throttled at the coolant flow amount control valve 5i. In the super-cooling apparatus 5c, the heat exchange operation is performed between the coolant and the water so that the water becomes the super-cooled water. Then the coolant flows into the outdoor unit 5B through the coolant flow path switching valve 5h and the connection means 5k incorporated for the outdoor unit 5B. Because the coolant is further cooled so that the super cooled level of the coolant become high in the heat exchanger 5b1 and the water flowing into the super cooling apparatus 5c is heated in the heat exchanger 5b1, the super-cooling apparatus 5c can generate the super-cooled water in stability.

FIG. 18 is a flow chart showing the operation of another base-load cooling operation in the ice regenerative air conditioner system 50 as the embodiment 5 as shown in FIG. 16.

When the regenerative unit 5A receives a cooling operation request signal from a control means (not shown), the pump 5a operates in the water circuit. In the coolant circuit in the regenerative unit 5A, the coolant flow path switching valve 5g is open, the coolant flow path switching valves 5h is closed and the coolant flow amount control valve 5i is closed.

As shown in FIG. 18, a cooled water or a cooled aqueous solution is supplied from the ice storage tank 5D in which the ice is generated and accumulated during midnight to the heat exchangers 5b1 and 5b2 and the super-cooling apparatus 5c. On the other hand, the condensed liquid or condensed coolant condensed by the outdoor unit 5B flows into the heat exchanger 5b2 through the heat exchanger 5b1 and the connection means 5j. In the heat exchangers 5b1 and 5b2, the condensed coolant is cooled so that the super-cooled level of the coolant becomes increased. Then, the coolant flows into the indoor unit 5C including the indoor heat exchanger. The cooling operation is performed by vaporing the coolant which flows into the indoor unit 5C. After this, the coolant returns into the outdoor unit 5B through the connection means 5m and 5j.

As described above, in the ice regenerative air conditioner system 50 of the embodiment 5, because the water or the aqueous solution from the ice storage tank 5D is heated by exchanging heat between this water and the coolant supplied from the outdoor heat exchanger unit 5B through the connection means 5j (or a first connection means) in the heat exchanger 5b (a third heat exchanger) and because the water or the aqueous solution is further heated in the heat exchanger 5b2 (a fourth heat exchanger) by exchanging heat between this water and the coolant from the heat exchanger 5b1 (the third heat exchanger), the super cooled level of the coolant become high in the heat exchanger 5b1 and the water flowing into the super cooling apparatus 5c is heated in the heat exchanger 5b1, and the super-cooling apparatus 5c can generate the super-cooled water in stability.

Embodiment 6.

The ice regenerative air conditioner system 60 as the embodiment 6 of the present invention will be explained with reference to FIGS. 19 and 20. In these drawings, a coolant flow in a coolant circuit and a water flow in a water circuit are designated by arrows.

Figure 19:
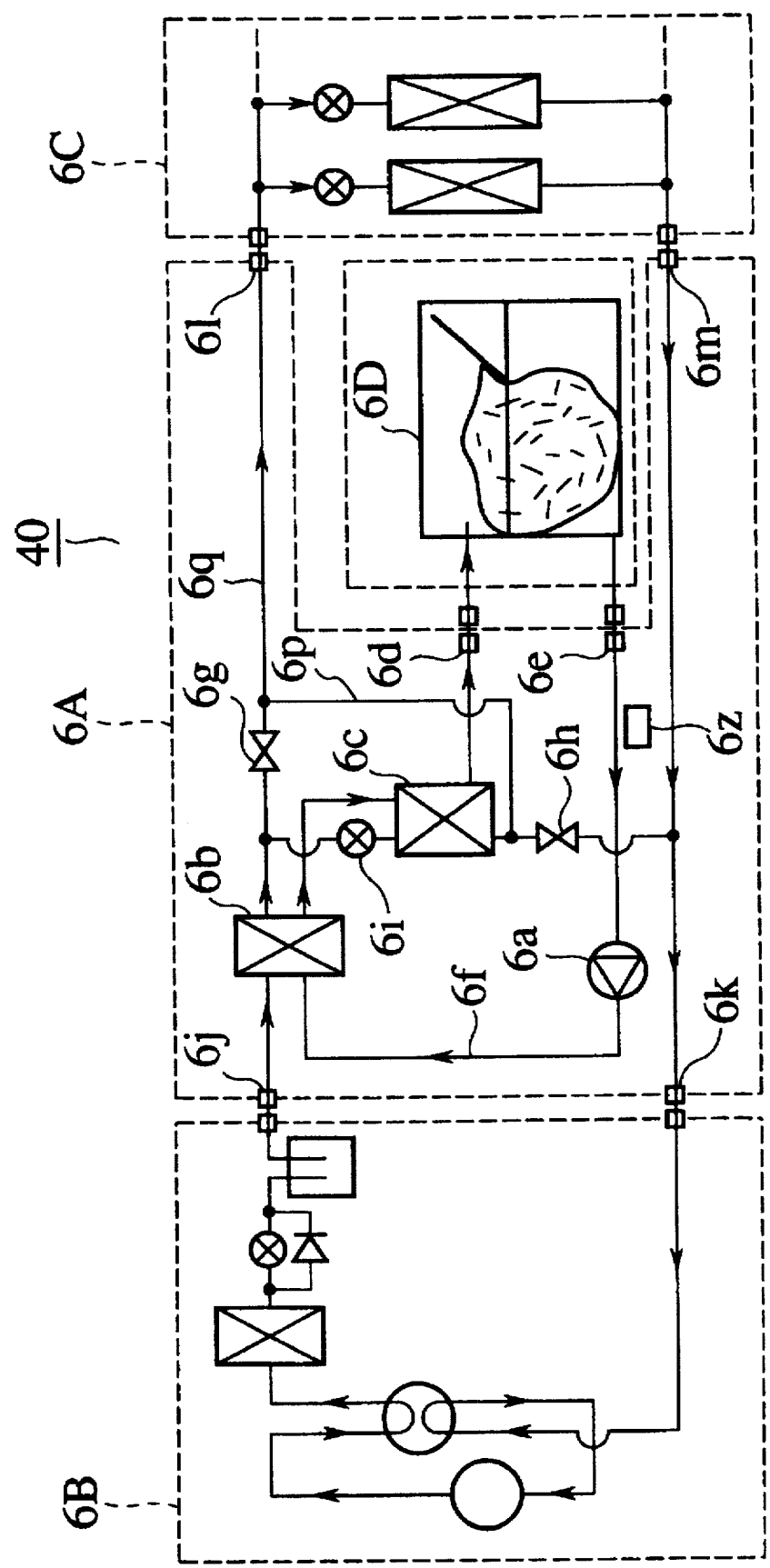
FIG. 19 is a diagram showing a configuration of an ice regenerative air conditioner system of the embodiment 6 according to the present invention.

FIG. 19 is a diagram showing a configuration of the ice regenerative air conditioner system as the embodiment 6 according to the present invention.

As shown in FIG. 19, the water circuit (in which the water or the aqueous solution is circulated for generating ice in a sherbet state), namely an ice generation flow path circuit, in the ice regenerative air conditioner system 60 comprises a pump 6a, a heat exchanger 6b for heating a water or an aqueous solution, a super-cooling apparatus c, two connection means 6d and 6e which are connected to the ice storage tank 6D, and a tube path 6f through which these components above are connected. In addition, the coolant circuit in a regenerative unit 6A comprises coolant flow path switching valves 6g and 6h, a coolant flow amount control valve 6i, a plurality of connection means 6j, 6k, 6l and 6m through which the regenerative unit 6A is connected to the outdoor unit 6B and the indoor unit 6C, a heat exchanger 6b, the super-cooling apparatus 6c, and a tube path 6q through which the components above are connected.

Thus, the ice regenerative air conditioner system 60 comprises the regenerative unit 6A, the outdoor unit 6B, the indoor unit 6C, the ice storage tank 6D. In the embodiment 6, a commercial available tank is also used as the ice storage tank 6D like the other embodiments described above.

Next, the operation of the ice accumulation operation in the ice regenerative air conditioner system 60 will be explained.

Figure 20:
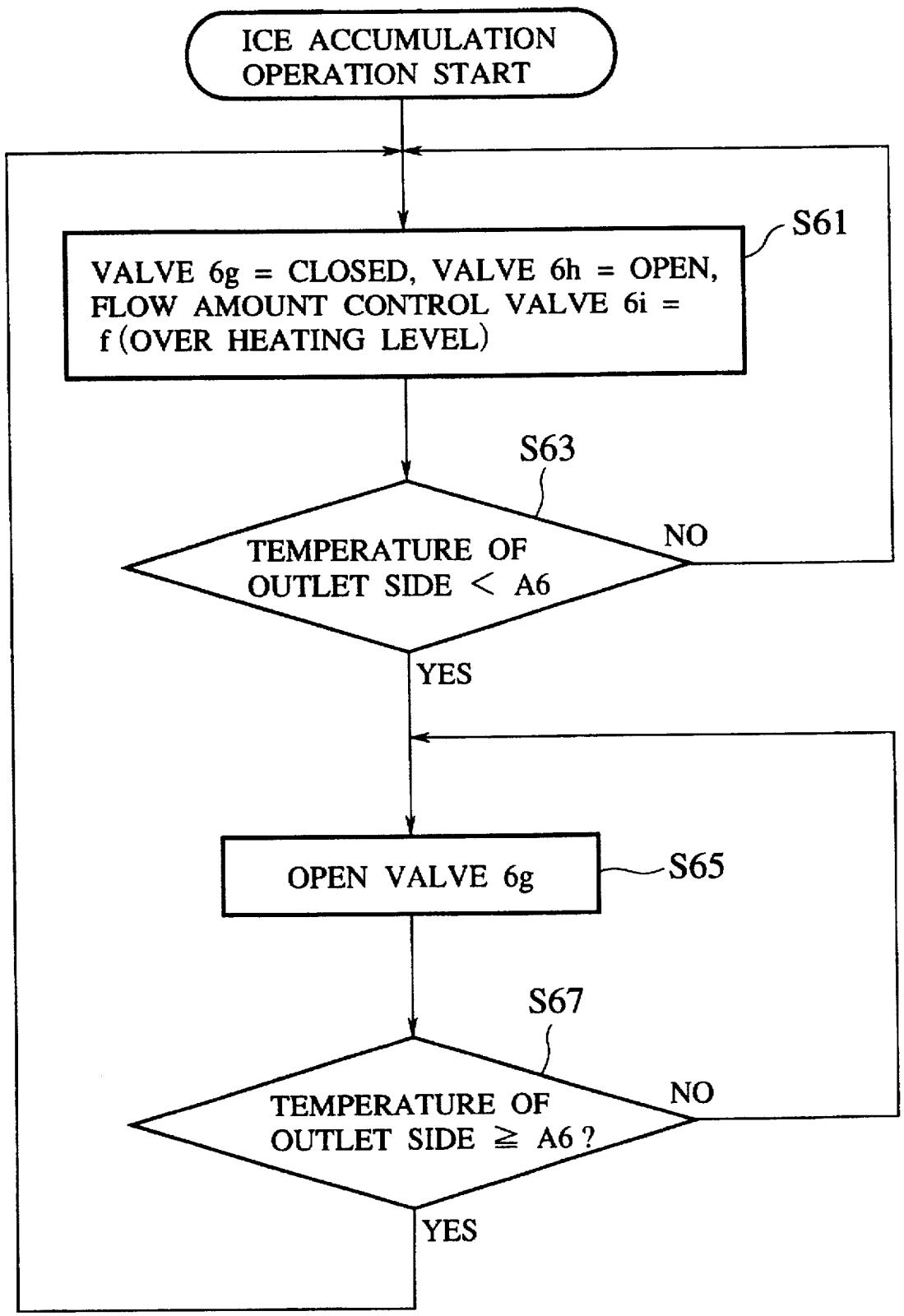
FIG. 20 is a flow chart showing the operation of an ice accumulation operation in the ice regenerative air conditioner system of the embodiment 6 as shown in FIG. 19.

FIG. 20 is a flow chart showing the operation of the ice accumulation operation in the ice regenerative air conditioner system 60 as the embodiment 6 as shown in FIG. 19.

When the regenerative unit 6A receives a cooling operation request signal from a control means (not shown), the pump 6a operates in the water circuit. In the coolant circuit in the regenerative unit 5A, the coolant flow path switching valve 6g is closed according to the temperature value of water or aqueous solution flowing from an outlet side of the ice storage tank, the coolant flow path switching valves 6h is open and the opening level of the coolant flow amount control valve 6i is changed based on the heating degree (temperature difference between the temperature values of the inlet side and the outlet side of the heat exchanger 6b) or the vapor temperature of the cycle designated by the temperature difference between both temperature values of the inlet side and outlet side in the heat exchanger (step S61).

Here, a cooled water or a cooled aqueous solution is supplied from the ice storage tank 6D in which the ice is generated and accumulated during midnight to the heat exchangers 6b and the super-cooling apparatus 6c. The condensed coolant condensed by the outdoor unit 6B flows into the heat exchanger 6b through the connection means 6j. In the heat exchangers 6b, the condensed coolant is cooled so that the super-cooled level of the coolant becomes increased. Then, the coolant from the heat exchanger 6b flows into the super-cooling apparatus 6c through the coolant flow amount control valve 6i. In the coolant flow amount control valve 6i, the coolant flow amount is throttled. In the super-cooling apparatus 6c, the heat exchange operation is performed between the coolant and the water. The water becomes the super-cooled water by the heat exchange operation in the super-cooling apparatus 6c. Then, the coolant flows into the indoor unit 6C including the indoor heat exchanger. The cooling operation is performed by vaporing the coolant which flows into the indoor unit 6C. After this, the coolant returns into the outdoor unit 6B through the connection means 6m and 6k.

The heat exchange amount between the coolant and the water in the heat exchanger 6b can be changed by adjusting the coolant flow amount in the cycle of cooling operation mode by using the coolant flow path switching valve 6g.

When the super-cooled water is generated (during the ice generation operation mode), it can be detected by checking the increase of the content of the ice in the water from the ice storage tank 6D whether or not the temperature value in the outlet side of the ice storage tank 6D is lower than the predetermined temperature value A6 (step S63).

Here, when the water temperature of the outlet side of the ice storage tank 6D is down than the predetermined value A6, the coolant flow path switching valve 6g is open (step S65) so that the coolant amount in the cooling operation cycle is reduced temporarily, the rate of the condensed heat in the heat exchange amount performed in the heat exchanger 6b is increased. Thereby, the water temperature of the outlet side of the ice storage tank 6D becomes high and the super-cooled water can be generated in stability.

Next, it is detected whether or not the water temperature of the outlet side of the ice storage tank 6D is over the predetermined value A6 (step S67), when this water temperature becomes over the predetermined value A6, the coolant flow path switching valve 6g is closed. Thereby, the coolant flows to the cooling cycle through the bypass tube path 6p, so that the rate of the condensed heat in the heat exchange amount in the heat exchanger 6b can be decreased.

As described above, by using the coolant flow path switching valve 6g and the bypass tube path 6p, the use of the cold of ice in the super-cooling apparatus 6c which is connected to the indoor heat exchanger in the indoor unit 6C can be possible during the cooling operation. In addition, by switching the use of the cold of ice in the heat exchanger, alternately, namely to condense the coolant and to increase the rate of the super-cooled level, the base load operation and the peak-shifted operation in the cooling operation having a wade load range can be performed with highly efficiency. In addition, because the regenerative unit 6A is formed in one unit, the ice regenerative air conditioner system 60 can be connected to a conventional air conditioner by using the connection means 6j, 6l, 6m and 6k.

Thus, the ice regenerative air conditioner system 60 of the embodiment 6, because the operation of the coolant flow path valve 6g placed between the heat exchanger 6b (the first heat exchange) and the indoor heat exchanger in the indoor unit 6C is controlled according to the water temperature of the outlet side of the ice storage tank 6D during the cooling operation mode, when the coolant flow path switching valve 6g is closed, the coolant flows through the bypass tube path 6p to the cooling cycle, so that the rate of the condensed heat amount in the heat exchange amount in the heat exchanger 6b can be reduced.

Embodiment 7.

The ice regenerative air conditioner system 70 as the embodiment 7 of the present invention will be explained with reference to the ice regenerative air conditioner system 10 of the embodiment 1 shown in FIG. 3 and FIG. 21.

Figure 21:
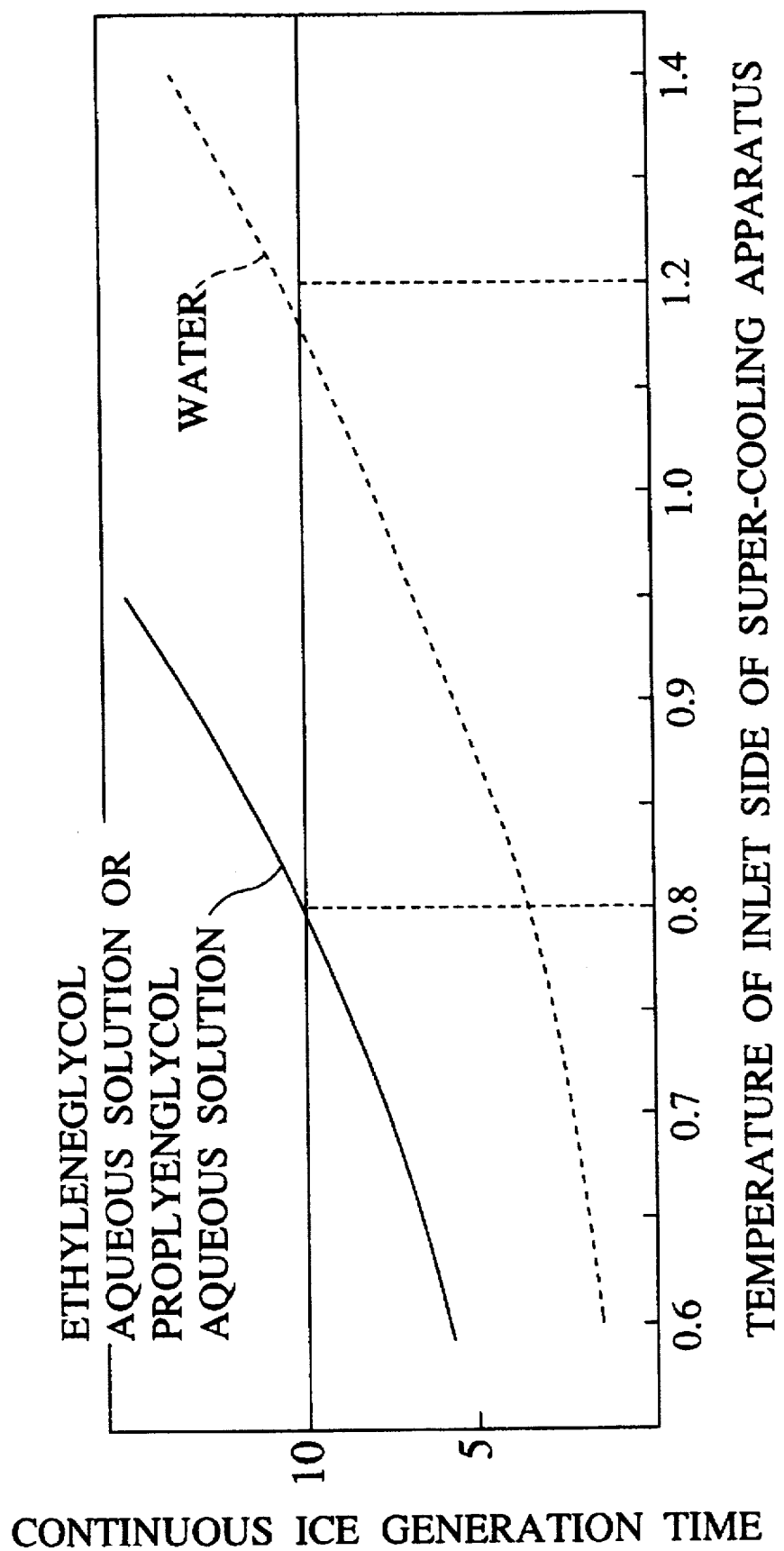
FIG. 21 is a diagram showing a relationship between a continuous ice generation time and a temperature of each of water and aqueous solution of the inlet side of a super-cooling apparatus in the ice regenerative air conditioner system of the embodiment 7 according to the present invention.

FIG. 21 is a diagram showing a relationship between a continuous ice generation time and the temperature of each of water and aqueous solution in the inlet side of the super-cooling apparatus used in the ice regenerative air conditioner system as the embodiment 7.

In FIG. 21, the relationship between the water or aqueous solution temperature and the super-cooled water or aqueous solution are shown. In addition, In FIG. 21, the two cases are shown. In the first case, the water is used as a heat accumulation material in ice storage tank 1D (or heat accumulation tank). In the second case, an aqueous solution such as an ethyleneglycol of not more than 80 wt % or a proplyenglycol of not more than 0.8 wt % in a water is used as the heat accumulation material in ice storage tank 1D.

Here, the aqueous solution temperature when the above aqueous solution is used can be reduced by ⅔ times rather than the water temperature when the water is used. In addition, the Cost Of Performance (C.O.P.) of the ice generation operation can be increased by reducing the heat exchange amount when the above aqueous solution is used as the heat accumulation material.

When an ethyleneglycol or a proplyenglycol of 0.8 wt % or less is added into a water in order to make the aqueous solution, although the freezing point of the aqueous solution is lower than that of a water only, the viscosity of the aqueous solution is higher than that of the water, so that the super-cooling aqueous solution can be generated in stability. Thereby, because the super-cooling rate can be increased, the cooling operation can be performed according to the required cooling load having a wide load range. In addition, thereby, the number of types and the number of indoor and outdoor units can be increased. Further, the system size can be reduced, because the same heat exchangers are used in both the ice generation operation cycle and the cooling operation cycle.

As described above, the ice regenerative air conditioner system of the embodiment 7, because an aqueous solution of an ethyleneglycol or a proplyenglycol of 0.8 wt % or less in a water is used as the heat accumulation material, although the freezing point of the aqueous solution is lower than that of a water only, the viscosity of the aqueous solution is higher than that of the water, so that the super-cooling aqueous solution can be generated in stability. Thereby, because the super-cooling rate can be increased, the cooling operation can be performed according to the required cooling load having a wide load range. In addition, thereby, the number of types and the number of indoor and outdoor units can be increased. Further, the system size can be reduced, because the same heat exchangers are used in both the ice generation operation cycle and the cooling operation cycle.

As described above in detail, the ice regenerative air conditioner system in the present invention, at the first heat exchanger placed in series to the indoor heat exchanger, the cooled liquid supplied from the ice storage tank is heated by exchanging heat between the cooled liquid from the ice storage tank and the coolant supplied from the outdoor heat exchanger. Then, in the second heat exchanger placed in parallel to the indoor heat exchangers, the super-cooled liquid is generated by exchanging the coolant and the cooled liquid which has been heated by the first heat exchanger. Thereby, during the ice accumulation operation mode, after the first heat exchanger heats the cooled liquid, this cooled liquid is further cooled in order to generate the super-cooled liquid by the second heat exchanger, and the super-cooled liquid flows into the ice storage tank to generate ice. On the other hand, during the base load cooling operation mode, the coolant flows into the indoor heat exchangers through the first heat exchanger from the outdoor heat exchanger in order to form a cooling cycle and to cool the indoor air. In addition, during the peak shifted cooling operation mode, in addition to the base load cooling operation mode, the second heat exchanger is used as a coolant amount adjustment tank in order to decrease the amount of the coolant in the cooling operation cycle. Therefore the super-cooled water or super-cooled aqueous solution can be generated in stability and the base load cooling operation and the peak-shifted cooling operation are executed by using the cold of ice efficiently. In addition, the heat amount to generate the super-cooled water or the super-cooled aqueous solution in stability can be reduced. Thereby the COP of the ice generation operation cycle can be increased.

Moreover, in the ice regenerative air conditioner system of the present invention, by locating the first and second heat exchangers into one unit, the ice regenerative air conditioner system can be formed in a compact size and it can be applicable to connect each independent air conditioner system such as a commercial available air conditioner unit.

Furthermore, in the ice regenerative air conditioner system of the present invention, in the case of the base load cooling operation mode, the cooled liquid can be super-cooled up to adequately super-cooled level by selecting the use of the second heat exchanger according to the cooling operation load. Thereby the power consumption equal to the amount of ice used in the cooling operation cycle can be reduced.

Moreover, in the ice regenerative air conditioner system of the present invention, during the peak-shifted operation mode, the area of heat exchanger is increased by selectively using the second heat exchanger according to the cooling operation load and the heat storage amount. Accordingly, the amount of ice consumption can be reduced. As a result, the electrical power can be reduced.

Furthermore, in the ice regenerative air conditioner system of the present invention, because the first heat exchanger comprises the two heat exchangers which are connected to each other with the coolant tube having the branch coolant circuit or path to the coolant flow amount control valve which is connected to the second heat exchanger, the coolant liquid is super-cooled until it has an adequate super-cooled level. Thereby, the super-cooled water or super-cooled aqueous solution can be generated in stability.

Moreover, in the ice regenerative air conditioner system of the present invention, because the coolant flow path switching valve for switching the coolant flow path is located between the first heat exchanger and the indoor heat exchangers and the coolant flow path switching valve is controlled based on the temperature of the ice storage tank during the ice accumulation operation mode, the rate of the condensed heat in the heat exchange amount in the first heat exchanger can be decreased by turning back the coolant into the ice accumulation cycle. Thereby the electrical power can be reduced.

In addition, in the ice regenerative air conditioner system of the present invention, because the cooled-liquid is made up of an ethyleneglycol of not more than 0.8 wt % or a proplyenglycol of not more than 0.8 wt % in addition to water, the stability of generation of the super-cooled liquid becomes high. Thereby, the super-cooled temperature rate becomes large, the cooling operation of a wide load range can be performed, and the number of or the kinds of indoor heat exchanger units and the outdoor heat exchangers becomes high. In addition, the size of the ice regenerative air conditioner system can be reduced because the same heat exchanger is used during both the ice generation operation cycle and the cooling operation cycle.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. An ice regenerative air conditioner system for generating ice by using a super-cooled liquid and for accumulating said ice, which comprises:

an outdoor heat exchanger for exchanging heat between outside air and a coolant gas in order to condense said coolant gas to a coolant;

a plurality of indoor heat exchangers for exchanging heat between indoor air and said coolant in order to cool said indoor air;

a first heat exchanger placed in series with said plurality of indoor heat exchangers for heating a cooled-liquid by exchanging heat between said cooled-liquid and said coolant supplied from said outdoor heat exchanger;

a second heat exchanger placed in parallel with said plurality of indoor heat exchangers for generating a super-cooled liquid by exchanging heat between said coolant and said cooled-liquid heated by said first heat exchanger; and an ice storage tank connected to said first heat exchanger and said second heat exchanger for generating and accumulating said ice.

2. An ice regenerative air conditioner system as claimed in claim 1, wherein said first heat exchanger and said second heat exchanger are incorporated into one unit.

3. An ice regenerative air conditioner system as claimed in claim 1, said second heat exchanger is used selectively according to a cooling operation load during a base load cooling operation mode.

4. An ice regenerative air conditioner system as claimed in claim 2, said second heat exchanger is used selectively according to a cooling operation load during a base load cooling operation mode.

5. An ice regenerative air conditioner system as claimed in claim 1, during a peak-shifted operation mode, said second heat exchanger is selectively used according to a cooling operation load and a heat storage amount in said ice storage tank.

6. An ice regenerative air conditioner system as claimed in claim 2, during a peak-shifted operation mode, said second heat exchanger is selectively used according to a cooling operation load and a heat storage amount in said ice storage tank.

7. An ice regenerative air conditioner system as claimed in claim 1, wherein said first heat exchanger comprises a pair of heat exchangers which are connected to each other with a coolant tube, and said coolant tube has a branch coolant path connected to a coolant flow amount control valve which is also connected to said second heat exchanger.

8. An ice regenerative air conditioner system as claimed in claim 2, wherein said first heat exchanger comprises a pair of heat exchangers which are connected to each other with a coolant tube, and said coolant tube has a branch coolant path connected to a coolant flow amount control valve which is also connected to said second heat exchanger.

9. An ice regenerative air conditioner system as claimed in claim 1, further comprises a coolant flow path switching valve for switching the coolant flow path between said first heat exchanger and said indoor heat exchangers, wherein during an ice accumulation operation mode for generating said ice in said ice storage tank, and an operation of said coolant flow path switching valve is controlled based on the temperature of an outlet side of said ice storage tank.

10. An ice regenerative air conditioner system as claimed in claim 2, further comprises a coolant flow path switching valve for switching the coolant flow path between said first heat exchanger and said indoor heat exchangers, wherein during an ice accumulation operation mode for generating said ice in said ice storage tank, and an operation of said coolant flow path switching valve is controlled based on the temperature of an outlet side of said ice storage tank.

11. An ice regenerative air conditioner system as claimed in claim 1, wherein said cooled-liquid is made up of an ethyleneglycol of not more than 80 wt % or a proplyenglycol of not more than 0.8 wt % in a water.

12. An ice regenerative air conditioner system as claimed in claim 2, wherein said cooled-liquid is made up of an ethyleneglycol of not more than 80 wt % or a proplyenglycol of not more than 0.8 wt % in a water.

* * * * *